United States Patent

Thompson et al.

[11] Patent Number: 5,822,584
[45] Date of Patent: Oct. 13, 1998

[54] USER SELECTABLE PRIORITY FOR DISK ARRAY BACKGROUND OPERATIONS

[75] Inventors: Mark J. Thompson, Spring; Stephen M. Schultz, Houston, both of Tex.

[73] Assignee: Compaq Computer Corporation, Houston, Tex.

[21] Appl. No.: 542,800

[22] Filed: Oct. 13, 1995

[51] Int. Cl.⁶ .................................................. G06F 9/46
[52] U.S. Cl. ......................... 395/673; 395/676; 395/677
[58] Field of Search .................................... 395/676, 677, 395/181, 673

[56] References Cited

U.S. PATENT DOCUMENTS

| | | |
|---|---|---|
| 5,101,492 | 3/1992 | Schultz . |
| 5,313,585 | 5/1994 | Jeffries et al. ........................... 395/275 |
| 5,473,761 | 12/1995 | Parks et al. .............................. 395/404 |
| 5,517,632 | 5/1996 | Matsumoto et al. ..................... 395/441 |
| 5,537,566 | 7/1996 | Konno et al. ............................ 395/441 |

Primary Examiner—Lucien U. Toplu
Assistant Examiner—Alice Park
Attorney, Agent, or Firm—Pravel, Hewitt, Kimball & Krieger

[57] ABSTRACT

A new and improved apparatus and method for rebuilding a replacement disk of a fault tolerant, mass storage drive array subsystem of a computer system. The method calls for a microprocessor to check a stripe for consistency. If the stripe is inconsistent, the microprocessor rebuilds a predetermined number of stripes. If the checked stripe is consistent, then the microprocessor checks a next stripe and repeats the above-described process. Because the drive array subsystem receives both system requests and rebuild requests, the present invention allows a user to select the drive array subsystem's priority in processing system requests versus rebuild requests, thereby allowing greater system access to the drive array subsystem during peak times of system requests.

26 Claims, 16 Drawing Sheets

| REBUILD_PRIORTY | DELAY OF COMMAND LIST 300 PROCESSING AS SET BY PAUSE_DURATION | FREQUENCY OF DELAYS AS SET BY PAUSE_INTERVAL |
|---|---|---|
| 0 | NONE | NONE |
| 1 | 0.1 s | ONE COMMAND LIST OUT OF 127 |
| 2 | 0.1 s | ONE COMMAND LIST OUT OF 126 |
| ⋮ | ⋮ | |
| 126 | 0.1 s | ONE COMMAND LIST OUT OF 2 |
| 127 | 0.1 s | EVERY COMMAND LIST |
| 128 | 0.1 s | EVERY COMMAND LIST |
| ⋮ | ⋮ | ⋮ |
| 136 | 0.2 s | EVERY COMMAND LIST |
| ⋮ | ⋮ | ⋮ |
| 144 | 0.3 s | EVERY COMMAND LIST |
| ⋮ | ⋮ | ⋮ |
| 254 | 1.6 s | EVERY COMMAND LIST |
| 255 | 1.6 s | EVERY COMMAND LIST |

FIG. 10

USER SELECTABLE PRIORITY FOR DISK ARRAY BACKGROUND OPERATIONS

BACKGROUND OF THE INVENTION

1. Field of the Invention

The present invention relates to the control of multiple disk drives within computer systems and more particularly to a more efficient method for recovering data stored on a drive in a mass storage disk drive array subsystem for a personal computer system.

2. Description of the Related Art

With the ever increasing amount of data being processed by today's computer systems, it is often desirable to have a mass storage subsystem to transfer large amounts of data to and from the computer system. Such a mass storage subsystem is commonly found in a local area network (LAN), wherein information and files stored on one computer, called a server, are distributed to local work stations having limited or no mass storage capabilities. Both its storage capacity and data transfer rate measure the mass storage subsystem's ability to meet the demands of the LAN. The need for very high data transfer rates can be readily appreciated given the high performance requirements of video graphic work stations used in computer aided design and animation work.

In order to achieve a mass storage subsystem with a high data transfer rate, a disk drive array subsystem, hereinafter referred to as a drive array, was developed in which multiple standard disk drives were "ganged" together in order to effect the parallel transfer of data to or from the drives of the drive array to system memory. This type of drive array is commonly referred to as a Redundant Array of Inexpensive Disks (RAID). If n drives are grouped together, then the effective data transfer rate is increased n times. This technique, called "striping," originated in the supercomputing environment where the transfer of large amounts of data to and from secondary storage is a frequent requirement. With this approach, the end physical drives become one or more logical volumes and may be implemented either through hardware or software.

Although a drive array has a much faster data transfer rate than a single physical drive with the same storage capacity, the overall drive failure rate of a n drive, drive array is n times that of the single high capacity drive; therefore, data protection configurations were developed to enhance the data integrity of the drive array. One such data protection configuration is known as mirroring, or alternatively as RAID1, wherein each main drive of the drive array has a duplicate drive, referred to as a mirror drive. A stripe consists of main logical blocks each having a duplicate mirror logical block. Thus, if the data in a main logical block becomes corrupted, the correct main logical block can be recovered from its associated mirror logical block.

Because the RAID1 architecture requires a duplicate drive for each main drive, drive array designers developed data protection configurations employing parity protection which only require one additional drive. One such system is known as RAID4. A RAID4 configuration employs mapping in which data are stored across all but one drive in a stripe. The remaining drive is the parity drive and it contains the parity a XOR value of the data blocks in the stripe. The stripe consists of n data logical blocks and one logical parity block, wherein each drive provides a logical block of the stripe. The logical blocks, which include one or more disk sectors, are the same size for each stripe size. The stripe size can vary within the drive array and within the logical volume itself. A write operation to a logical volume consists of either writing all data logical blocks of a stripe to the logical volume or writing less than all data logical blocks of the stripe to the logical volume. The former is known as a full stripe write, and the latter is known as a partial stripe write. The parity logical block must be updated regardless if a partial or a full stripe write occurs. The parity logical block is created using an exclusive-or (XOR) technique as known to those skilled in the art. Should the data in one logical block become corrupted, a correct logical block can be regenerated from the other logical blocks using the known XOR technique.

The configuration of physical drives which comprise the drive array is transparent to the computer system. Instead, the host computer system addresses the striped data in the drive array by logical volume and logical block number. Each logical volume includes one or more stripes of data. Logical blocks belonging to several logical volumes might use one physical drive.

There are many variations of the parity and mirror fault tolerant data protection schemes described above. Another parity fault tolerant data protection scheme mapping is RAID5 which does not use a dedicated physical parity drive as in RAID4, but rather the parity logical blocks are interleaved with the data logical blocks among the n drives of the drive array. A write operation to the drive array always generates new parity information. Thus, for every write operation, the dedicated parity drive of the RAID4 data protection scheme must be accessed. The RAID5 data protection system accesses the physical drives more evenly. Additionally, another data protection scheme is known informally as RAID10, wherein each of the main physical drives in a RAID5 system has a mirror drive.

The above-mentioned fault tolerant data protection schemes employed in drive arrays, while promoting the stripe data integrity of the drive array, also provide a means for rebuilding a physical replacement drive should one of the main physical drives of the drive array fail. The remaining main drives of the array provide the information necessary to rebuild the physical replacement drive from the remaining drives. For a RAID1 system, the physical replacement drive can be rebuilt from the failed disk drive's mirror drive. For a RAID4 or RAID5 system, a logical block on the replacement drive is rebuilt by XORing the other logical blocks of its stripe, and this process is repeated until all logical blocks of the replacement drive are rebuilt.

In a computer system employing the drive array, it is desirable that the drive array remain on-line should a physical drive of the drive array fail. Such is the case for the LAN. If a main physical drive should fail, drive arrays currently have the capability of allowing a spare physical replacement drive to be rebuilt without having to take the entire drive array off-line. Furthermore, intelligent drive array subsystems currently exist which can rebuild the replacement drive transparent to the computer system and while the drive array is still otherwise operational. Such a system is disclosed in Schultz et al., U.S. Pat. No. 5,101,492, entitled "Data Redundancy and Recovery Protection," which is hereby incorporated by reference.

Time is critical when rebuilding a physical drive of a drive array because if another main physical drive fails during the rebuilding process, all of the data stored may be lost. Thus, it is desirable to minimize the rebuild time of the physical replacement drive in order to improve the data integrity of the drive array.

Although it is desirable to rebuild a physical drive in a timely and efficient manner while the remainder of the drive array is still operational, the ongoing rebuild operation must compete with system requests, especially those system requests requiring the access of logical volumes that are fully operational. The drive array must process system requests along with internal requests generated by rebuilding operations. Thus, it would be desirable for a user of the computer system to have the capability to adjust the priority of the rebuild operations of the drive array, thereby assigning the rebuild operations of the drive array lower priority during peak computer system usage times and higher priority during times of reduced computer system activity.

SUMMARY OF THE PRESENT INVENTION

The present invention relates to a new and improved rebuild algorithm and apparatus for rebuilding a physical replacement drive in a fault tolerant drive array. In the preferred embodiment of the present invention, a local processor of the drive array reads a stripe from a logical volume of the drive array that uses the physical replacement drive. The local processor then checks the stripe for consistency. If the stripe is inconsistent, the local processor sequentially rebuilds a predetermined number of stripes beginning with the checked stripe; however, if the checked stripe is consistent, then the local processor does not rebuild the stripe, but instead the local processor sequentially checks a next stripe for consistency, wherein the above-described process is repeated. Because the present invention reduces the number of required writes to the drive array, the rebuilding time of the physical replacement drive is decreased, thereby improving the data integrity of the drive array.

The present invention also relates to a method for selecting priority between execution of physical requests originating from system requests and execution of physical requests originating from background drive array operations. In the preferred embodiment of the present invention, a user of the computer system can utilize a priority command which includes a pause interval parameter and a pause duration parameter. The priority command is submitted to the drive array wherein the local processor parses the priority command in order to determine the pause interval parameter and the pause duration parameter.

The pause duration and pause interval parameters define rebuild priority. The local processor executes a foreground task which parses a logical command list submitted by the host processor into host logical requests. In the foreground task, the local processor executes the host logical requests, thereby forming physical requests from each host logical request. In the preferred embodiment of the present invention, the local processor, after delaying for the time specified by the pause interval parameter, then delays execution of the foreground task, the time of which is set by the pause duration parameter. This delay allows more physical requests generated by background disk operations to be processed. In the preferred embodiment of the present invention, the background disk operations include rebuild operations. When the foreground task is delayed, the local processor processes more physical requests submitted by rebuild operations, thereby effectively advancing the priority of the rebuild operations. Thus, the user of the computer system can adjust the priority between rebuild operations and computer system requests.

BRIEF DESCRIPTION OF THE DRAWINGS

A better understanding of the present invention can be obtained when the following detailed description of the preferred embodiment is considered in conjunction with the following drawings, in which:

FIG. 10 is a chart illustrating the composition of a REBUILD_PRIORITY parameter;

FIG. 1 is a flowchart diagram illustrating a SET_PARAM module which obtains the REBUILD_PRIORITY parameter from SET_PARAMETER command;

DETAILED DESCRIPTION OF THE PREFERRED EMBODIMENT

Figure 1:
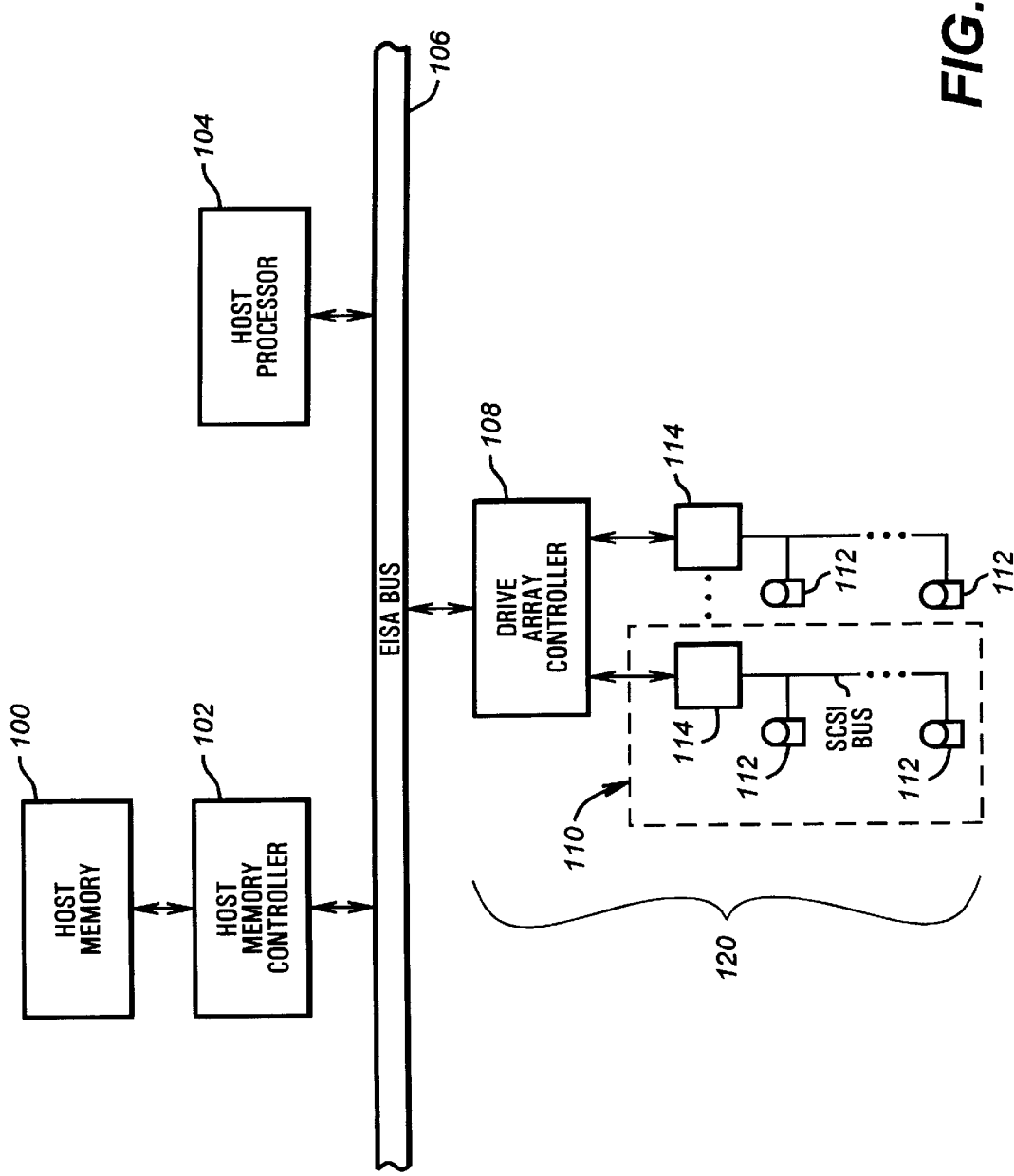
FIG. 1 is a block diagram of a computer system incorporating the present invention.

FIG. 1 is a block diagram illustrating a computer system which incorporates the present invention. Shown in FIG. 1 is a host processor 104 which has its data, address and control lines interfaced to an extended industry standard architecture (EISA) bus 106. Also shown in FIG. 1 is a host memory 100 and a host memory controller 102 which is coupled between EISA bus 106 and host memory 100. Additionally, shown in FIG. 1 is a drive array 120. Host processor 104 builds a logical command list 300 (see FIG. 3) in host memory 100 which is retrieved by a drive array controller 108 for execution. Drive array controller 108 has its data, address and control lines interfaced to EISA bus 106. Each logical command list 300 might contain one or more host logical requests for one logical volume of drive array 120. Drive array controller 108, functioning as an EISA bus master, retrieves logical command list 300 from host memory 100. Physical drive units 110 are coupled to drive array controller 108. Each drive unit 110 contains at least one SCSI bus controller 114 which can control up to seven disk drives 112 on a SCSI bus. In the preferred embodiment, bus controller 114 is a NCR 53C825 PCI-SCSI I/O processor which functions as a bus master to retrieve its physical commands from any accessible system memory space. Multiple bus controllers 114 and multiple SCSI buses can be connected to the drive array controller 108.

Data and parity information are stored in drive array 120 in "stripes" of data. Each stripe can be further subdivided into logical blocks which include one or more physical disk sectors. Each logical block of a stripe is located in a different drive 112 in order to effect the parallel transfer of data to the drive array 120. For example, in order to employ a RAID4 or RAID5 configuration on drive array 120, drive array 120 would include a number of disk drives 112. One stripe would include a logical block located on each drive 112 forming the drive array 120.

From the perspective of host processor 104, drive array 120 is subdivided into logical volumes, wherein each logical volume includes one or more stripes. Each logical volume begins at the same physical disk sector on all physical drives 112 used by the logical volume. A particular stripe is addressed by its logical volume and logical block number. Some of the drives 112 are main drives and mirror drives which contain stripes of data; and some drives 112 are designated as main spare drives and mirror spare drives which can be used as physical replacements for the main and mirror drives. A rebuilt spare drive that is being used by the logical volume is denoted an "active" spare drive.

Now describing the overall operation of the computer system shown in FIG. 1, host processor 104 first builds logical command list 300 in host memory 100. Logical command list 300 might contain host logical requests for one logical volume. Logical command list 300 might alternatively include, for example, diagnostic operations for one logical volume. Drive array controller 108, by a protocol discussed further below, then retrieves logical command list 300 from host memory 100. Drive array controller 108 then generates physical commands in order for physical drives 112 to carry out the operations specified by the host logical requests in logical command list 300. In the preferred embodiment, drive array controller 108 can function as a bus master, thereby having the capability to initiate the transfer of blocks of data to and from host memory 100.

It is understood that different host computer system architectures could be used and a PCI or other bus could be used instead of an EISA bus. Such differences are apparent to one skilled in the art.

Figure 2:
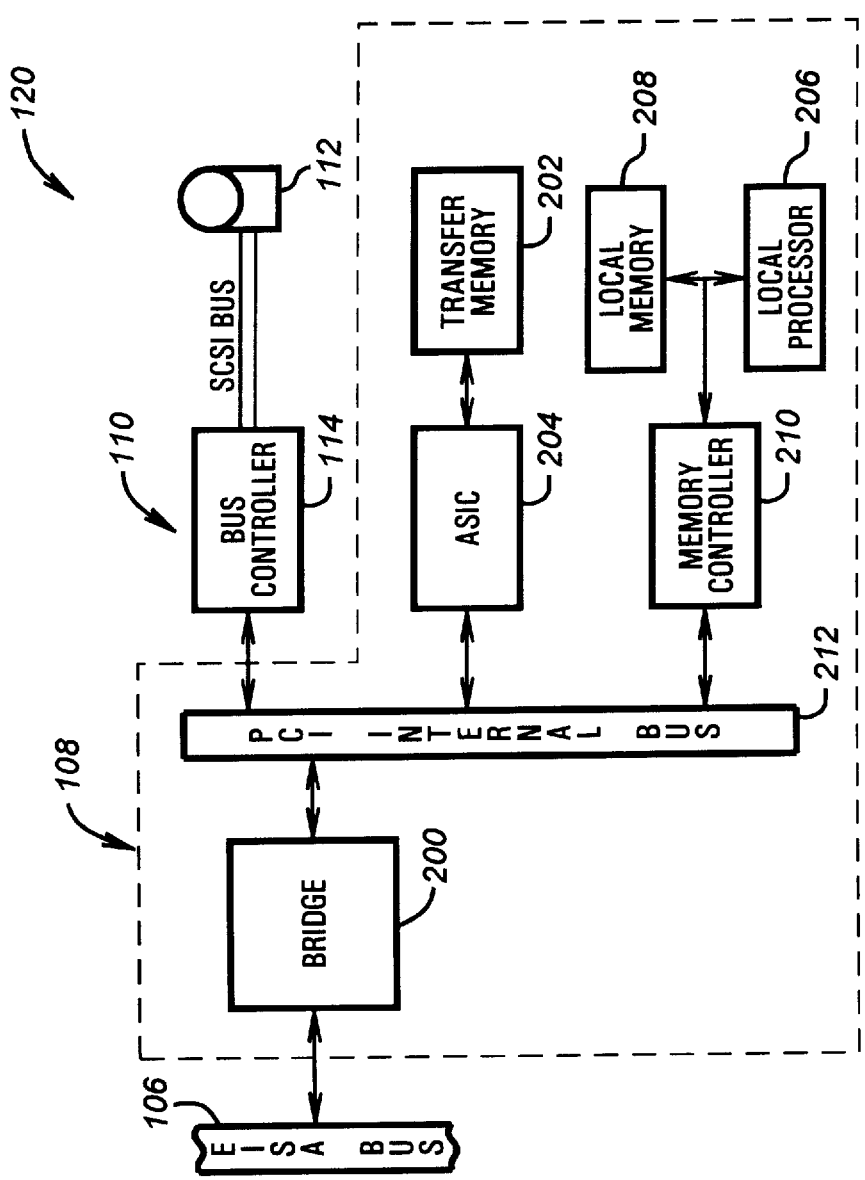
FIG. 2 is a block diagram illustrating the drive array controller of FIG. 1.

Now referring to FIG. 2, shown in FIG. 2 is a more detailed block diagram illustrating drive array controller 108. As shown in FIG. 2, drive array controller 108 has a local peripheral component interconnect (PCI) bus 212 which is interfaced to EISA bus 106 through a bridge circuit 200. Also shown in FIG. 2 is a local processor 206 which performs the steps necessary to carry out the present invention; however, the present invention could alternatively be performed by host processor 104. In the preferred embodiment, local processor 206 is an AMD 29030 processor. Local processor 206 has address, data and control lines coupled to a local memory 208 which includes read only memory (ROM) and random access memory (RAM). Local processor 206 is interfaced to PCI bus 212 through a memory controller 210. Memory controller 210 allows local processor 206 to access PCI bus 212 and allows a PCI bus master to access local memory 208. Furthermore, as explained further below, memory controller 210 also functions as a direct memory access (DMA) controller which can be programmed by host processor 104 to retrieve logical command lists from host memory 100.

Also shown in FIG. 2 is a transfer memory 202. Transfer memory 202 is used for caching writes to drive array controller 120 and for internal drive array 120 operations such as the rebuild operations performed by the present invention. Transfer memory 202 is interfaced to PCI bus 212 through an application specific integrated circuit (ASIC) 204. ASIC 204 functions as a memory controller, a bus master and a DMA controller which is programmed by local processor 206. ASIC 204 can perform memory transfers within transfer memory 202, from host memory 100 to transfer memory 202 and from transfer memory 202 to host memory 100. ASIC 204 also allows a PCI bus master to access transfer memory 202.

Memory controller 210 provides automated logical command list 300 fetching for disk controller 120 by functioning as a DMA controller. The address of logical command list 300 is written to a logical command list pointer FIFO register which is located inside controller 210. To transfer logical command list 300 from host memory 100 to disk array controller 120, host processor 104 reads the logical command list pointer FIFO register to confirm there is room for another logical command list address pointer. If the logical command list pointer FIFO register is clear, then the address of logical command list 300 is written to the logical command list pointer FIFO register. Memory controller 210 then retrieves a portion of logical command list 300 into a logical command list FIFO inside controller 210. If logical command list 300 is larger than the logical command list FIFO, local processor 206 retrieves the remainder of logical command list 300 from host memory 100. Upon completion of processing logical command list 300, local processor 206 writes a completion pointer FIFO register inside controller 210 with the host memory 100 address of the completed logical command list 300.

Because of the overhead of local processor 206, a single batch operating system is not used in the preferred embodiment. Thus, local processor 206 employs a multitasking operating system. Alternative embodiments of the invention are envisioned in which another microprocessor, such as host processor 104, performs the steps necessary to carry out the present invention.

Figure 3:
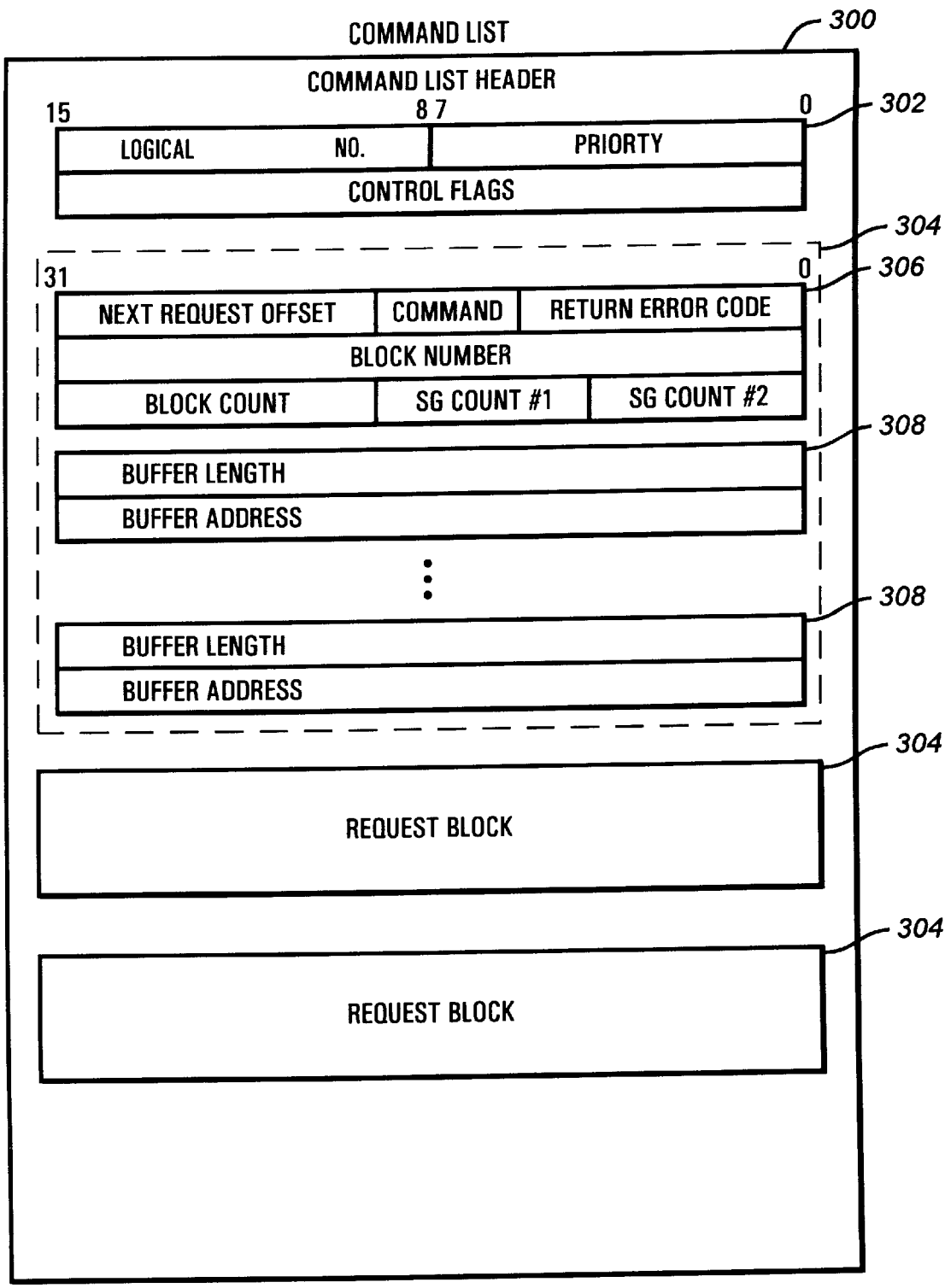
FIG. 3 is a block diagram illustrating the structure of a logical command list generated by the host computer for processing by the drive array controller of FIG. 1.

Shown in FIG. 3 is a block diagram of logical command list 300 which is generated by host processor 104. Shown in FIG. 3 is a logical command list header 302 which includes a logical volume number, a priority of logical command list 300 and control flags.

The control flags initially include the size of logical command list 300, thereby informing local processor 206 whether the entire logical command list 300 exists in the logical command list 300 FIFO. Also included in logical command list 300 are request blocks 304, each containing a fixed length request handler 306 which contains an address of the next request block 304 in logical command list 300, a command for the logical volume, a return error code, a logical block number, a logical block count and two scatter/gather descriptor counters. The command of request block 304 operates upon the data in host memory 100 as addressed by the scatter/gather descriptors in blocks 308. Each logical command list 300 directs operations of one logical volume and as shown in FIG. 3, logical command list 300 can include several request blocks 304. A more detailed description of logical command list 300 is found in U.S. Pat. No. 5,101,492 which has been incorporated by reference.

Local processor 206 parses logical command list 300 into logical requests to form a command structure in local memory 208. One logical request is formed from each request block 304. The logical requests in the command structure are then scheduled for execution by a foreground task, whereby physical drive requests are created to carry out each logical request. The foreground task, FOREGROUND, is discussed further with the discussion of FIGS. 13 and 14. The command structure may also include logical requests originating with local processor 206 instead of through the submission of logical command list 300 as described above.

Such is the case in the present invention in which logical rebuild requests are generated by local processor 206. The logical rebuild requests, although not processed by the foreground task to form physical requests, are included in the command structure in order to properly log processed logical requests. A request identifier attached to each logical request separates host requests from internally generated requests, thereby informing the foreground task not to execute the logical rebuild requests.

When the foreground task processes logical command list 300, local processor 206 generates physical requests in order to distribute or retrieve data from drive units 110. Local processor 206 builds these physical requests in local memory 208 which can be accessed through memory controller 210 by an intended disk controller 114 acting as a bus master. In another embodiment, the intended disk controller 114 functions as a slave device, wherein local processor 206 writes the physical requests directly to the intended disk controller 114. Alternatively, local processor 206 could place the physical requests in host 104 or transfer 202 memory.

Transfer memory 202 serves several functions. Transfer memory 202 can function as a posted write buffer to reduce the number of partial write operations. For the present invention, transfer memory 202 is used as a buffer which stores read logical blocks from drives 112 in order to aid local processor 206 in rebuilding a logical block and checking for consistent stripes.

An arbiter inside bridge 200 governs bus master priority on bus 212 among memory controller 210, ASIC 204 and SCSI bus controllers 114. Bridge circuit 200 has the highest priority, memory controller 210 and local processor 206 have the next highest priority, and the priority of the remaining PCI bus master is determined on a first come, first serve basis.

Primarily due to the read-ahead ability of modern disk drives 112, a write operation to a disk drive 112 is inherently slower than a read operation. Thus, the present invention, which relates to reducing the rebuild time of a physical replacement drive, reduces the number of unnecessary write operations to the physical replacement drive that are performed in traditional rebuild operations. In particular, the present invention searches for unused sectors on the physical replacement drive. If unused sectors are discovered on the replacement drive, then these unused sectors do not need to be rebuilt, thereby eliminating an unnecessary write operation. In order to check for unused sectors, the preferred embodiment of the present invention checks for a consistent stripe using an XOR technique as known to those skilled in the art. This XOR technique is employed to identify unused sectors because unused disk sectors have a consistent data pattern. Thus, an unused stripe will have consistent logical blocks.

The following is a brief overview of the rebuilding process employed by the present invention. By traversing all local volumes, local processor 206 checks drives 112 used by each checked logical volume looking for the physical replacement drive which has already been marked by the local processor 206 to replace a failed drive. Several logical volumes may use one physical drive. The mapping of the physical replacement drive for the failed drive may be done by a task run by local processor 206 or by a software routine executed by processor 104. The reserved information sectors (RIS) sectors for each logical volume using the physical replacement drive are updated to indicate that the logical volume needs rebuilding. Furthermore, a REBUILD_NEEDED flag, as discussed further below, is set to TRUE to indicate that at least one logical volume of the drive array needs rebuilding. Local processor 206 updates the status of each logical volume as it is rebuilt; therefore, it is possible to have rebuilt logical volumes using a common physical replacement drive which has not been completely rebuilt. In order to accomplish this, the present invention monitors the physical replacement status of each logical volume instead of the physical replacement status of the physical replacement drive in its entirety.

To rebuild a stripe in a parity fault tolerant array, local processor 206 generates a logical rebuild request and the associated physical requests. In particular, logical blocks from a stripe of data to be rebuilt are read into transfer memory 202 from the non-replacement replacement drives 112 used by the logical volume that needs rebuilding. Each logical block is read into an allocated memory buffer in memory 202. These logical blocks are then XORed together in order to obtain the rebuilt block for the replacement drive. The rebuilt block is then written to the replacement drive.

A rebuild operation for a mirror fault tolerant array does not employ the above-described XOR technique. In order to rebuild a logical block on the physical replacement main drive, the corresponding logical block is read into transfer memory 202 from the appropriate mirror drive. The rebuilt block is then written to the rebuilding replacement drive.

As discussed above, the present invention checks for consistent stripes. In order to check for a consistent stripe, local processor 206 reads all logical blocks from a checked stripe into transfer memory 202. The logical blocks are then XORed together to check for consistency using ASIC 204. The above-described XOR methods could be implemented a number of different ways including a hardware XOR as disclosed in "Disk Array Controller for Generating Parity Information," which is hereby incorporated by reference. The XOR process could also be accomplished using known software methods. If the XOR operation produces a null logical block, then the checked stripe is consistent.

Before a giving a more detailed discussion of the rebuild methodology of the present invention, a brief overview of reserved information sectors (RIS) parameters which exist on each drive 112 is given below. The RIS parameters include information which relate to the individual drives 112 and the drive array 120 in its entirety. On a global level, RIS information includes the particular drive 112 ID; the configuration signature; the RIS revision level; the drive 112 configuration; the physical number of drives 112 which make up a logical volume; and the drive state for each logical volume. Drive array controller 108 controls access to these RIS parameters. Without "permission" from drive array controller 108, no bus master can access the RIS parameters. Upon configuration of the drive array, local processor 206 stores the global RIS information in local memory 208 in a data structure referred to as GLOBAL_RIS. The GLOBAL_RIS data RIS information is updated by local processor 206 as needed.

FIGS. 4A–4C, 5 and 6 are flowchart diagrams illustrating a REBUILD module which determines whether a logical volume is using a physical replacement drive; rebuilds or checks the consistency of one stripe of a logical volume if the logical volume is using the physical replacement drive; and updates the logical volume is rebuild status accordingly. The REBUILD module is called repeatedly by the background task as long as a REBUILD_NEEDED flag or a REBUILD_RUNNING flag set equal to TRUE. The REBUILD module begins at step 500 wherein local processor 206 checks a REBUILD_RUNNING flag to determine whether a logical volume is currently being rebuilt. REBUILD_RUNNING is set equal to TRUE when a logical volume that needs rebuilding has been identified by REBUILD and that logical volume is currently being rebuilt; and REBUILD_RUNNING is set equal to FALSE when a logical volume is not currently being rebuilt, and REBUILD then scans the logical volumes for one that needs rebuilding. The REBUILD_NEEDED flag is set equal to TRUE whenever a replacement drive is hot-plugged into the system. If a logical volume is currently being rebuilt, REBUILD_RUNNING will be equal to TRUE and control will transfer to step 564 wherein local processor 206 rebuilds a single stripe of the logical volume. If REBUILD_RUNNING is FALSE, then control transfers from step 500 to step 504 wherein local processor checks the REBUILD_NEEDED flag in order to determine whether all logical volumes need to be checked to determine whether any other logical volumes are using a physical replacement drive and need to be rebuilt. REBUILD_NEEDED is set equal to TRUE to indicate to REBUILD that all logical volumes need to be checked to see if any other volumes need to be rebuilt, and REBUILD_NEEDED is set equal to FALSE to indicate that the logical volumes do not need to be checked after the current logical volume is rebuilt. If REBUILD_NEEDED is TRUE, then control transfers from step 504 to step 505 wherein local processor 206 initializes a REBUILD_VOLUME parameter which keeps track of the currently checked logical volume. Furthermore, in step 505 local processor 206 sets REBUILD_NEEDED to FALSE because REBUILD will continue to check logical volumes until REBUILD_VOLUME indicates all logical volumes have been checked. Control transfers from step 505 to step 510. If in step 504 REBUILD_NEEDED is FALSE, then control transfers from step 504 to step 506 wherein local processor 506 determines from REBUILD_VOLUME whether all logical volumes have been checked. If so, control then transfers from step 506 to step 508 wherein REBUILD is terminated. If all logical volumes have not been checked, then control transfers from step 506 to step 510.

When control transfers to step 510, local processor 206 reads GLOBAL_RIS from local memory 208 to determine the drive states and parity distribution scheme employed by the physical drives used by the logical volume checked by REBUILD. Control then transfers to step 512 wherein local processor 206 determines from GLOBAL_RIS whether the logical volume employs mirror fault tolerance. If so, then control transfers to step 514 wherein local processor 206 determines from GLOBAL_RIS the drive state information pertaining to one main physical drive used by the currently checked logical volume. This drive state information indicates whether the main drive is a physical replacement or a failed drive. Furthermore, this drive state information will contain the physical replacement and drive failure status for the main spare, mirror, and spare mirror drives associated with the main drive. Additionally, the drive status for the spare drives will indicate which, if any, of the spare drives have been rebuilt and are currently active. For a logical volume employing a mirror fault tolerant data protection scheme, the REBUILD module maps the physical replacement drive as a rebuild drive which is rebuilt from a source drive.

Control transfers from step 514 to step 516 wherein local processor 206 begins an algorithim to determine the drive to be rebuilt, the rebuild drive. The rebuild drive will be rebuilt from the source drive. In step 516, local processor 206 determines whether the main drive is the physical replacement, and if so, then control transfers from step 516 to step 518. If the main drive is not the physical replacement, then control transfers from step 516 to step 520. In step 518, local processor 206 maps the main drive to the rebuild drive. Control transfers from step 518 to step 530.

In step 520, local processor 206 determines whether the mirror drive is the physical replacement, and if so, then control transfers from step 520 to step 522. If not, then control transfers from step 520 to step 524. In step 522, local processor 206 maps the mirror drive to the rebuild drive. Control transfers from step 522 to step 530.

In step 524, local processor 206 determines whether the main spare drive is the physical replacement, and if so, then control transfers from step 524 to step 526. If not, then control transfers from step 524 to step 528. In step 526, local processor 206 maps the main spare drive to the rebuild drive. Control transfers from step 526 to step 530.

In step 528, local processor 206 determines whether the mirror spare drive is the physical replacement, and if so, then control transfers from step 528 to step 529. If not, then control transfers from step 528 to step 538. In step 529, local processor 206 maps the mirror spare drive to the rebuild drive. Control transfers from step 529 to step 530.

In step 538, local processor 206 determines whether there are more drives to check, and if so, then control transfers from step 538 back to step 514. If there are no more drives to check, then control transfers from step 538 to step 556.

In step 530, local processor 206 begins an algorithim to determine the source drive that is used to rebuild the rebuild drive. In step 530, local processor 206 determines whether the rebuild drive can be rebuilt from the main drive, and if so, then control transfers from step 530 to step 531. If not, then control transfers from step 530 to step 532. In step 531, local processor 206 maps the main drive to the source drive. Control transfers from step 531 to step 556.

In step 532, local processor 206 determines whether the rebuild drive can be rebuilt from the mirror drive, and if so, control transfers from step 532 to step 533. If not, then control transfers from step 532 to step 534. In step 533, local processor 206 maps the mirror drive to the source drive. Control transfers from step 533 to step 556.

In step 534, local processor 206 determines whether the rebuild drive can be rebuilt from the main spare drive, and if so, then control transfers from step 534 to step 535. If not, then control transfers from step 534 to step 536. In step 535, local processor 206 maps the main spare drive to the source drive. Control transfers from step 535 to step 556.

In step 536, local processor 206 determines whether the rebuild drive can be rebuilt from the mirror spare drive, and if so, then control transfers from step 536 to step 537. If not, then control transfers from step 536 to step 538. In step 537, local processor 206 maps the mirror spare drive to the source drive. Control transfers from step 537 to step 556.

Figure 4A:
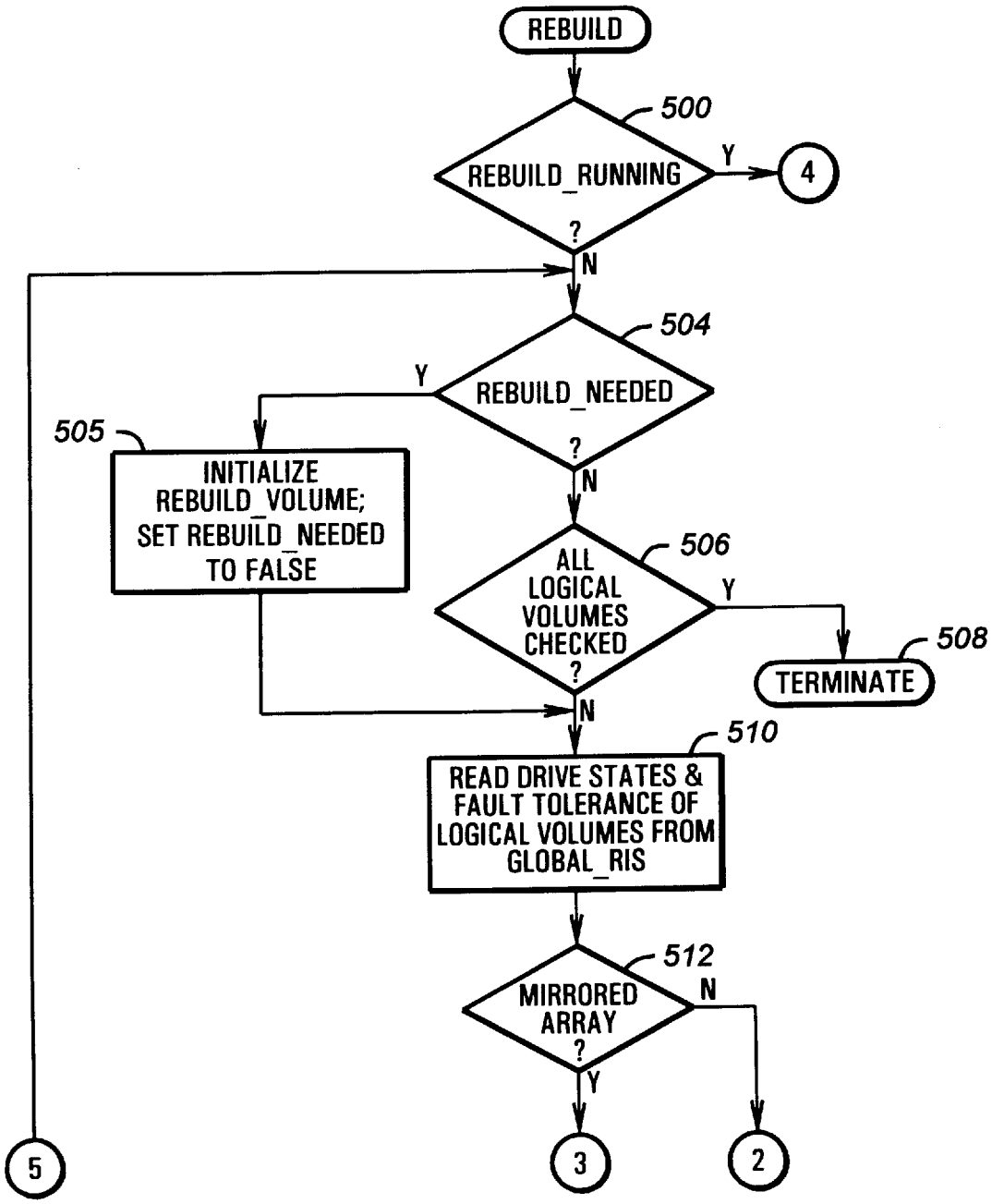
FIGS. 4A–4C, 5 and 6 are a flowchart diagram illustrating a REBUILD module which determines if a logical volume of the drive array uses a physical replacement drive, updates logical volume status and rebuilds one or more logical volumes.
Figure 4B:
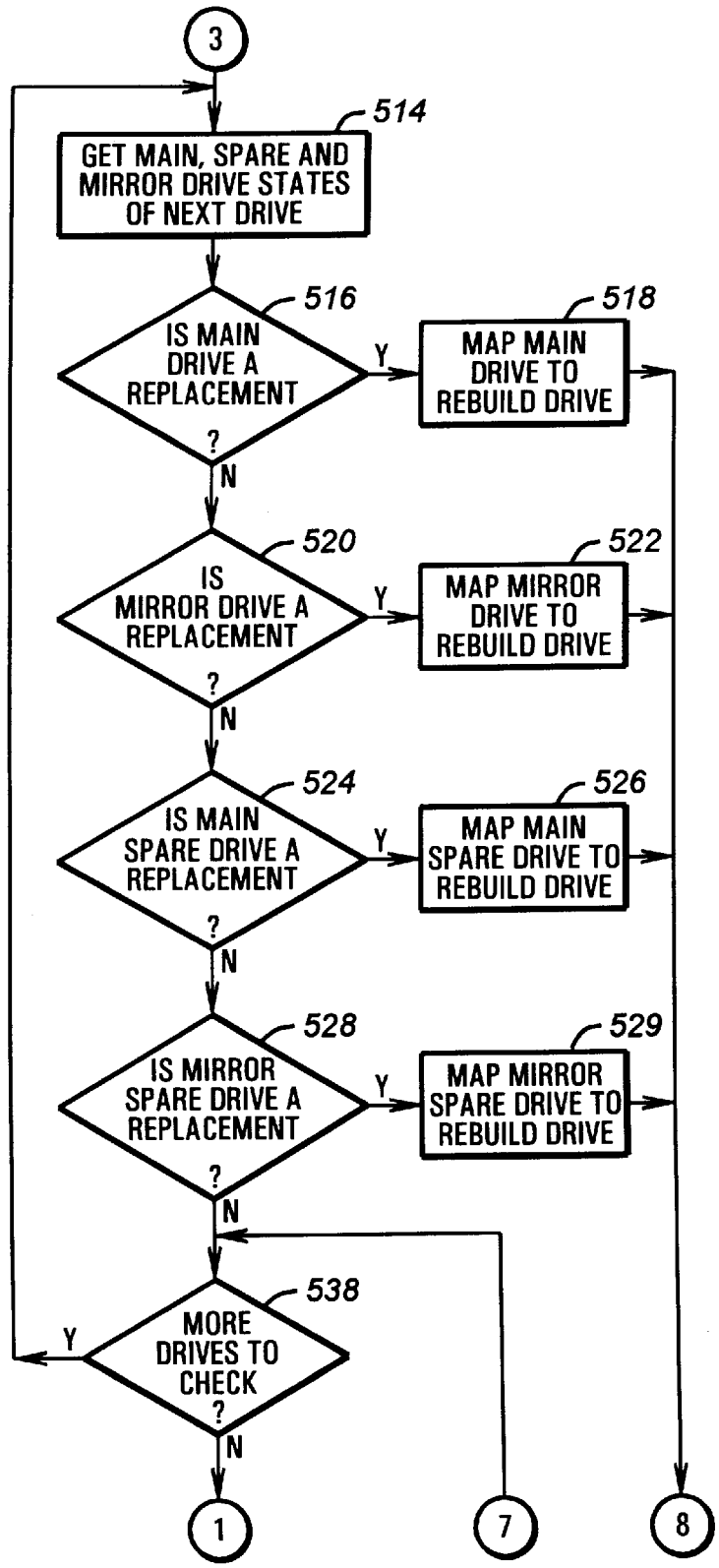
Figure 4C:
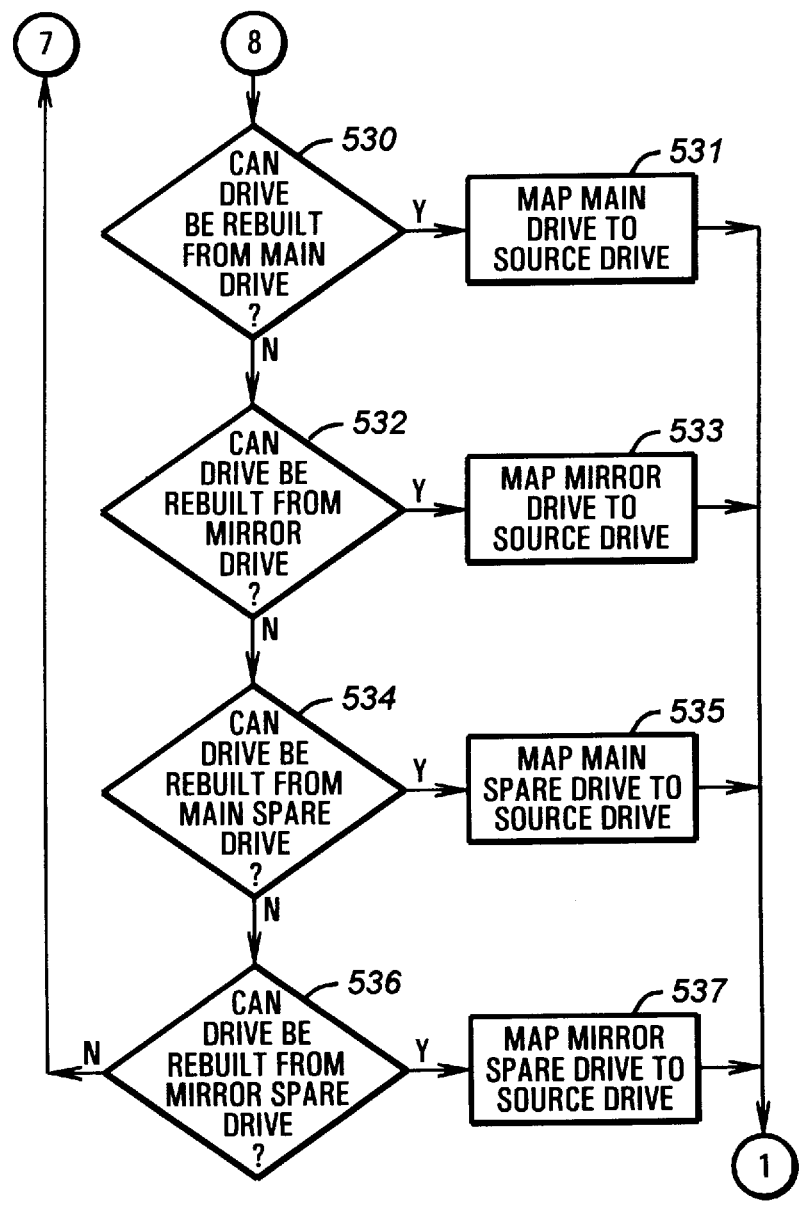
Figure 5:
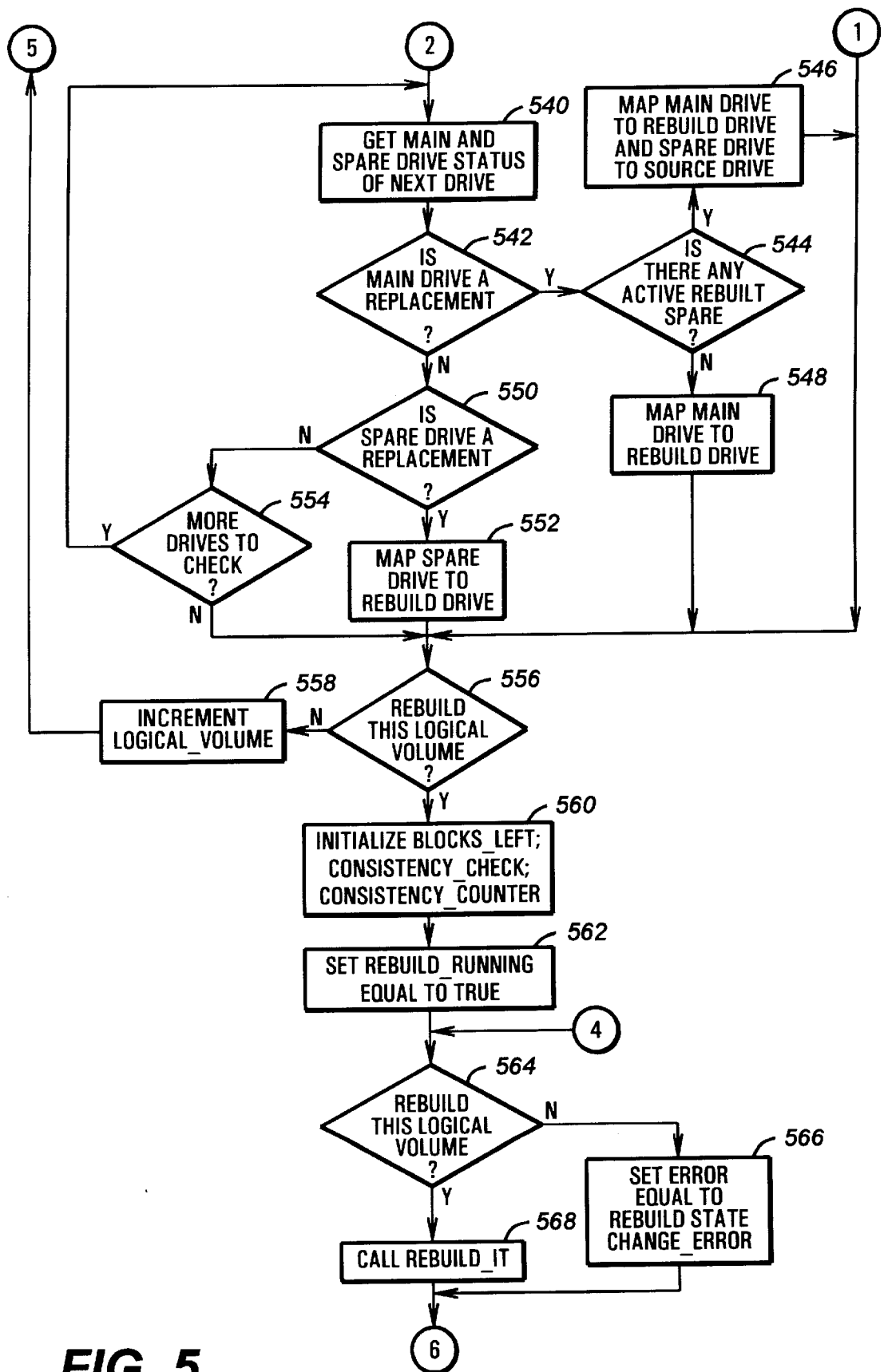
Figure 6:
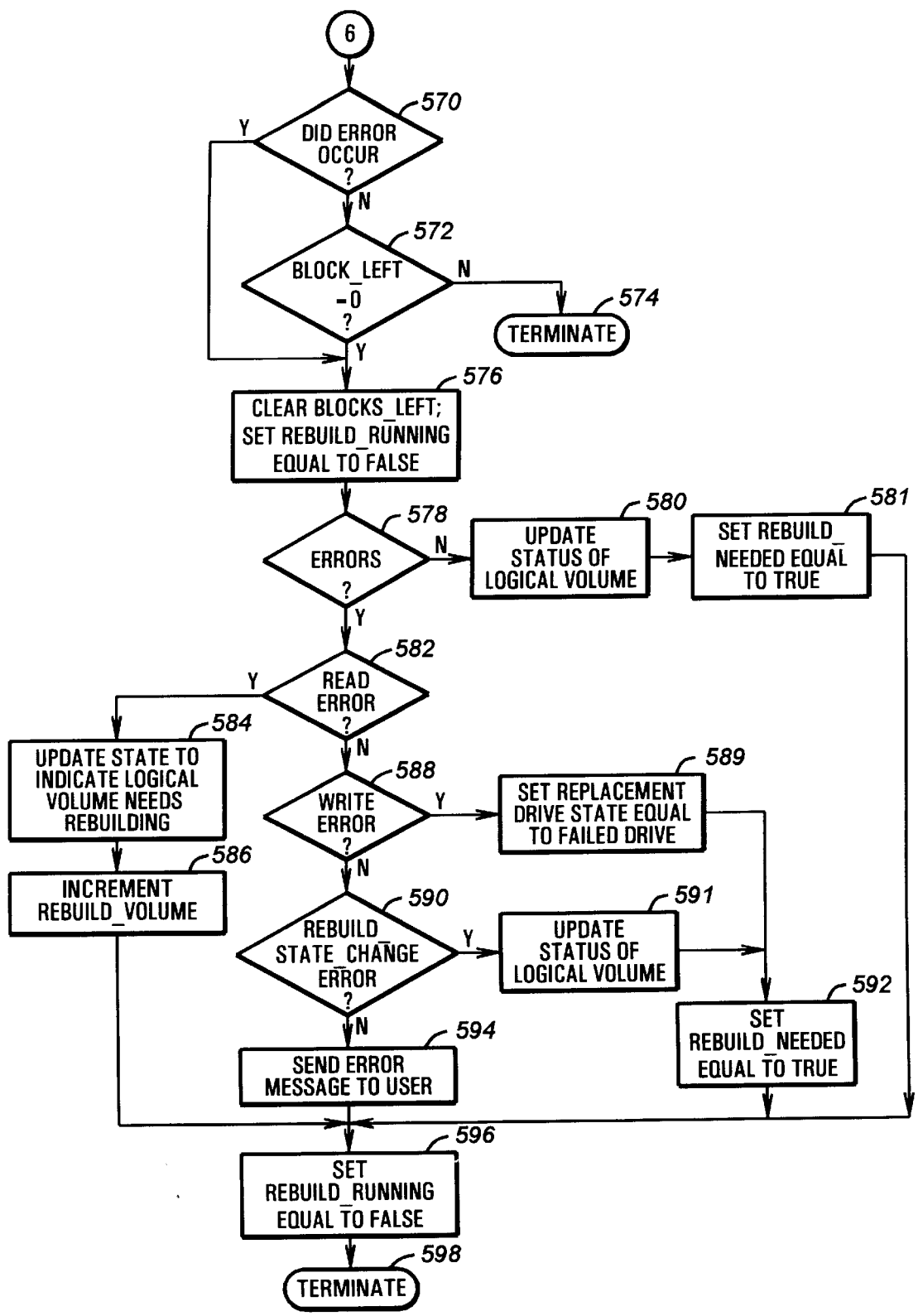

Now referring to FIGS. 4A and 5, if in step 512 local processor 206 determines from GLOBAL_RIS that the currently checked logical volume does not employ a mirror fault tolerant data protection scheme, then control transfers to step 540, thereby indicating the currently checked logical volume employs a parity fault tolerant data protection scheme. In step 540, local processor 206 reads the drive state information for one main drive and the drive state information for that main drives associated spare drive of the currently checked logical volume. Control then transfers to step 542 wherein local processor 206 determines whether the main drive is the physical replacement. If so, control transfers to step 544 wherein local processor 206 determines whether there is an active rebuilt spare drive. If so, then control transfers to step 546 wherein the main drive is mapped to the rebuild drive and the spare drive is mapped to the source drive. For this particular case, the main drive will be rebuilt as if the main and spare drive were used by a logical volume employing a mirror fault tolerant data protection scheme. Control then transfers to step 556. If there is not an active rebuilt spare drive, then control transfers to step 548 wherein the main drive is mapped to the rebuild drive. The main drive will be rebuilt using the remaining active drives 112 used by the logical volume. Control then transfers to step 556.

If local processor determines in step 542 that the main drive is not the physical replacement, then control transfers to step 550 wherein local processor 206 determines whether the spare drive is the physical replacement. If so, then control transfers to step 552 wherein the spare drive is mapped to the rebuild drive so that the spare drive will be rebuilt from the remaining active drives used by the logical volume. Control then transfers from step 552 to step 556. If the spare drive is not the physical replacement, then control transfers from step 550 to step 554. If in step 554, there are more drives 112 to check, then control transfers to step 540. If in step 554 there are no more drives 112 to check in the currently checked logical volume, then control then transfers to step 556.

In step 556, local processor 206 determines whether the currently checked logical volume needs to be rebuilt. If so, control then transfers to step 560 from step 556 wherein local processor 206 initializes a BLOCKS_LEFT parameter which keeps track of the logical blocks left to rebuild in the logical volume. Furthermore, in step 560, local processor 206 initializes a CONSISTENCY_CHECK parameter and a CONSISTENCY_COUNTER parameter which will be discussed further with the discussion of FIG. 7. Control transfers from step 560 to step 562 wherein local processor 206 sets REBUILD_RUNNING equal to TRUE. Control then transfers from step 562 to step 564. If in step 556, local processor 206 determines that the currently checked logical volume does not need to be rebuilt, control transfers from step 556 to step 558 wherein local processor 206 increments LOGICAL_VOLUME, thereby allowing REBUILD to check a next logical volume. Control then transfers from step 558 to step 504.

Control reaches step 564 when REBUILD_RUNNING is equal to TRUE which occurs when a logical volume is being rebuilt. In step 564, local processor 206 determines from GLOBAL_RIS whether the current logical volume is being rebuilt. If not, then control transfers from step 564 to step 566 wherein local processor 206 sets an ERROR flag equal to REBUILD_STATE_CHANGE_ERROR to indicate that the state of the logical volume has been updated, such as when the host issues a command to reconfigure the logical volume, thereby aborting the rebuild operation. If the state of the logical volume indicates that the logical volume needs rebuilding, then control transfers from step 564 to step 568 wherein local processor 206 calls a rebuild iteration module, REBUILT_IT, which rebuilds a single stripe of the logical volume. Control transfers from steps 566 and 568 to step 570 wherein local processor 206 checks ERROR to determine whether an error has occurred. If so, control transfers from step 570 to step 576. If ERROR indicates an error did not occur, then control transfers from step 570 to step 572 wherein local processor 206 determines whether BLOCKS_LEFT is zero, thereby indicating the logical volume has been rebuilt. If not, control transfers from step 572 to step 574 wherein REBUILD is terminated. If the logical volume has been rebuilt, then control transfers from step 572 to step 576.

In step 576, local processor 206 clears BLOCKS_LEFT. Furthermore, in step 576 REBUILD_RUNNING is set equal to FALSE, thereby ensuring the rebuilding of the logical volume will cease. Control transfers from step 576 to step 578 wherein local processor 206 checks ERROR to determine whether any error has occurred in the rebuilding of the logical volume. If not, control transfers from step 578 to step 580 wherein local processor 206 updates the RIS parameters to indicate the logical volume has now been rebuilt. Control then transfers from step 580 to step 581 wherein REBUILD_NEEDED is set equal to TRUE in order that all logical volumes will be checked again. Control then transfers from step 581 to step 596.

If errors did occur in the rebuilding of the logical volume, control transfers from step 578 to step 582 wherein local processor 206 checks whether a read error, READ_ERROR, has occurred. If so, control transfers from step 582 to step 584 wherein local processor 206 updates the RIS to indicate the logical volume needs rebuilding. Control then transfers from step 584 to step 586 wherein REBUILD_VOLUME is incremented in order to prevent an infinite rebuild loop for the current logical volume. Control then transfers from step 586 to step 596. If no READ_ERROR occurred, control transfers from step 582 to step 588 wherein local processor 206 determines whether a write error, WRITE_ERROR, occurred during the rebuilding of the logical volume. If so, then control transfers from step 588 to step 589 wherein local processor 206 updates the RIS to indicate the replacement drive has failed. Control then transfers from step 589 to step 592. If a WRITE_ERROR did not occur in the rebuilding of the logical volume, control transfers from step 588 to step 590 wherein local processor 206 determines whether the REBUILD_STATE_CHANGE_ERROR error occurred in the rebuilding of the logical volume. If so, control transfers from step 590 to step 591 wherein local processor 206 correctly updates the RIS parameters. Control then transfers from step 591 to step 592 wherein local processor 206 sets REBUILD_NEEDED equal to TRUE. Control then transfers from step 592 to step 596. If the REBUILD_STATE_CHANGE_ERROR error did not occur in the rebuilding of the logical volume, control transfers from step 590 to step 594 wherein local processor 206 sends an error message to the user to indicate that an unknown error occurred in the rebuilding of the logical volume. Control then transfers from step 594 to step 596 wherein REBUILD_RUNNING is set equal to FALSE. Control then transfers from step 596 to step 598 wherein REBUILD is terminated.

To summarize the functions of the REBUILD module, the REBUILD module checks the logical volumes, one at a time, in order to determine whether the checked logical volume uses a physical replacement drive. If so, REBUILD then determines from the fault tolerance used by the logical volume and the drive status of the drives mapped to the logical volume whether the logical volume can be rebuilt and the drive or drives which will be used to rebuild the logical volume. If the logical volume can be rebuilt, REBUILD then rebuilds the logical volume one stripe at a time. Once the logical volume has been rebuilt, REBUILD updates the status of the logical volume, and REBUILD checks all logical volumes again.

Figure 7:
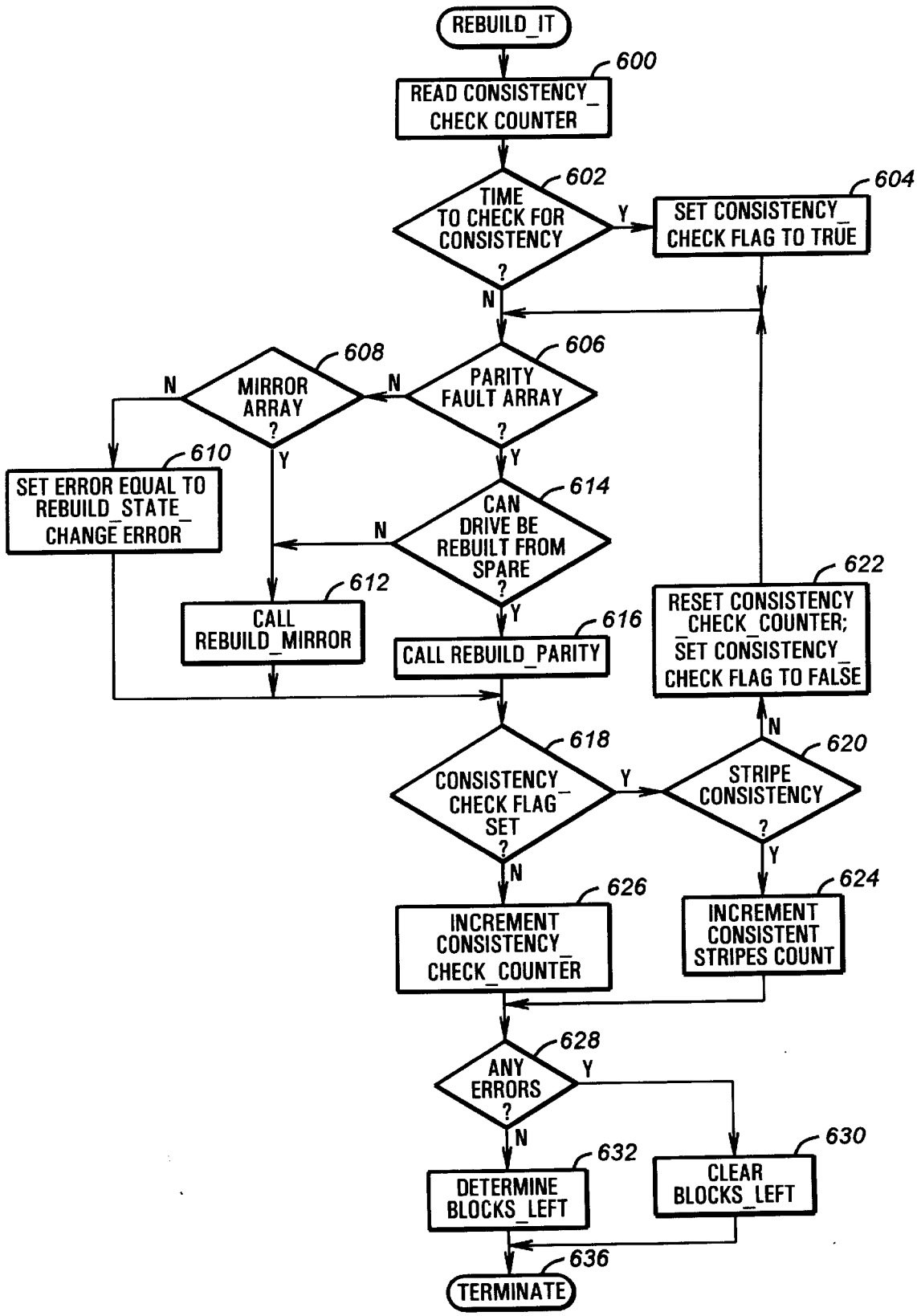
FIG. 7 is a flowchart diagram illustrating a rebuild iteration module, REBUILD_, which rebuilds a single stripe and checks for a consistent stripe.

FIG. 7 is a block diagram of the rebuild iteration routine, REBUILD_IT, which rebuilds a single stripe and then returns with the status information regarding the rebuilding of the stripe. REBUILD_IT is called by the REBUILD module. REBUILD_IT begins in step 600 wherein local processor 206 reads a CONSISTENCY_CHECK_COUNTER parameter. The CONSISTENCY_CHECK_COUNTER allows for a predetermined number of stripes to be rebuilt before a stripe is checked by REBUILD_IT for consistency. Control transfers from step 600 to step 602 wherein local processor 206 checks whether it is time to check for a consistent stripe. If so, control then transfers to step 604 wherein local processor 206 sets a CONSISTENCY_CHECK flag to TRUE which indicates that it is time to check for a consistent stripe. Control then transfers from step 604 to step 606. If it is not time to check for a consistent stripe, control transfers from step 602 to step 606.

In step 606 local processor 206 checks GLOBAL_RIS to determine whether it is rebuilding a logical volume employing a parity fault tolerant data protection scheme. If not, then control transfers from step 606 to step 608 wherein local processor 206 determines from GLOBAL_RIS whether the logical volume to be rebuilt employs a mirror fault tolerant data protection scheme. If not, then control transfers to step 610 wherein the ERROR flag is set to the REBUILD_STATE_CHANGE_ERROR error to indicate RIS and GLOBAL_RIS need to be updated. If GLOBAL_RIS indicate that a logical volume employing a mirror fault tolerant data protection scheme is being rebuilt, then control transfers to step 612 wherein a REBUILD_MIRROR module is called which rebuilds a single mirror stripe. Control transfers from both steps 610 and 612 to step 618.

In step 606 if GLOBAL_RIS indicate that a logical volume employing a parity fault tolerant data protection scheme is being rebuilt, then control transfers to step 614 wherein local processor 206 checks whether the rebuild drive can be rebuilt from its active spare drive. If so, control then transfers to step 612 wherein REBUILD_MIRROR is called. If the rebuild drive cannot be rebuilt from its active spare drive, then control transfers to step 616 wherein a REBUILD_PARITY module is called to rebuild a single parity stripe. Control then transfers from step 616 to step 618.

In step 618 local processor 206 checks whether CONSISTENCY_CHECK has been set equal to TRUE. If so, then REBUILD_MIRROR or REBUILD_PARITY, as discussed further below, would have checked for the consistency of the stripe instead of rebuilding the stripe. If CONSISTENCY_CHECK has been set equal to TRUE, then control transfers from step 618 to step 620 wherein local processor 206 determines whether the checked stripe is consistent by determining if a CONSISTENT flag is set. If the checked stripe is inconsistent, then CONSISTENCY_CHECK_COUNTER is reset, CONSISTENCY_CHECK is set to FALSE and control is transferred back to step 606 wherein the checked stripe will be rebuilt. Furthermore, the predetermined number of stripes will be rebuilt before another stripe is checked for consistency. In step 620 if local processor 206 determines that the checked stripe is consistent, then control transfers to step 624 wherein local processor 206 increments the consistent stripes count for log data and transfers control to step 628. Note that CONSISTENCY_CHECK is still TRUE; therefore, the next stripe processed by REBUILD_will also be checked for consistency.

If in step 618 CONSISTENCY_CHECK has been set equal to FALSE, then control transfers to step 626 wherein CONSISTENCY_CHECK_COUNTER is incremented. Control then transfers from step 626 to step 628. In step 628 local processor 206 determines whether any errors have occurred in the rebuilding of the stripe. If so, then control transfers to step 630 wherein local processor 206 clears BLOCKS_LEFT, thereby ensuring no more rebuilding will occur of the portion of the physical replacement drive used by the logical volume. Upon returning from REBUILD_ID, local processor 206, seeing that there are no more blocks left to rebuild, will set REBUILD_RUNNING to FALSE, thereby allowing REBUILD to check the rebuild completion status of the logical volume. If in step 628 local processor 206 determines that there were no errors in the rebuilding of the stripe, then control transfers to step 632 wherein local processor 206 calculates the new BLOCKS_LEFT. Control transfers from both steps 632 and 630 to step 636 wherein REBUILD_IT is terminated.

To summarize the functions of the REBUILD_IT module, the REBUILD_IT module determines the fault tolerance used by the logical volume being rebuilt and calls the appropriate module, REBUILD_MIRROR or REBUILD_PARITY, to either rebuild a stripe or check the stripe for consistency. The REBUILD_IT module controls the value of the CONSISTENCY_CHECK flag. If CONSISTENCY_CHECK is FALSE, the stripe is rebuilt, and if CONSISTENCY_CHECK is TRUE, the stripe is checked for consistency. REBUILD_IT checks for consistent stripes after the predetermined number of stripes have been rebuilt. If the checked stripe is inconsistent, the predetermined number of stripes will be rebuilt; however, if the checked stripe is consistent, the next stripe will be checked for consistency.

Figure 8:
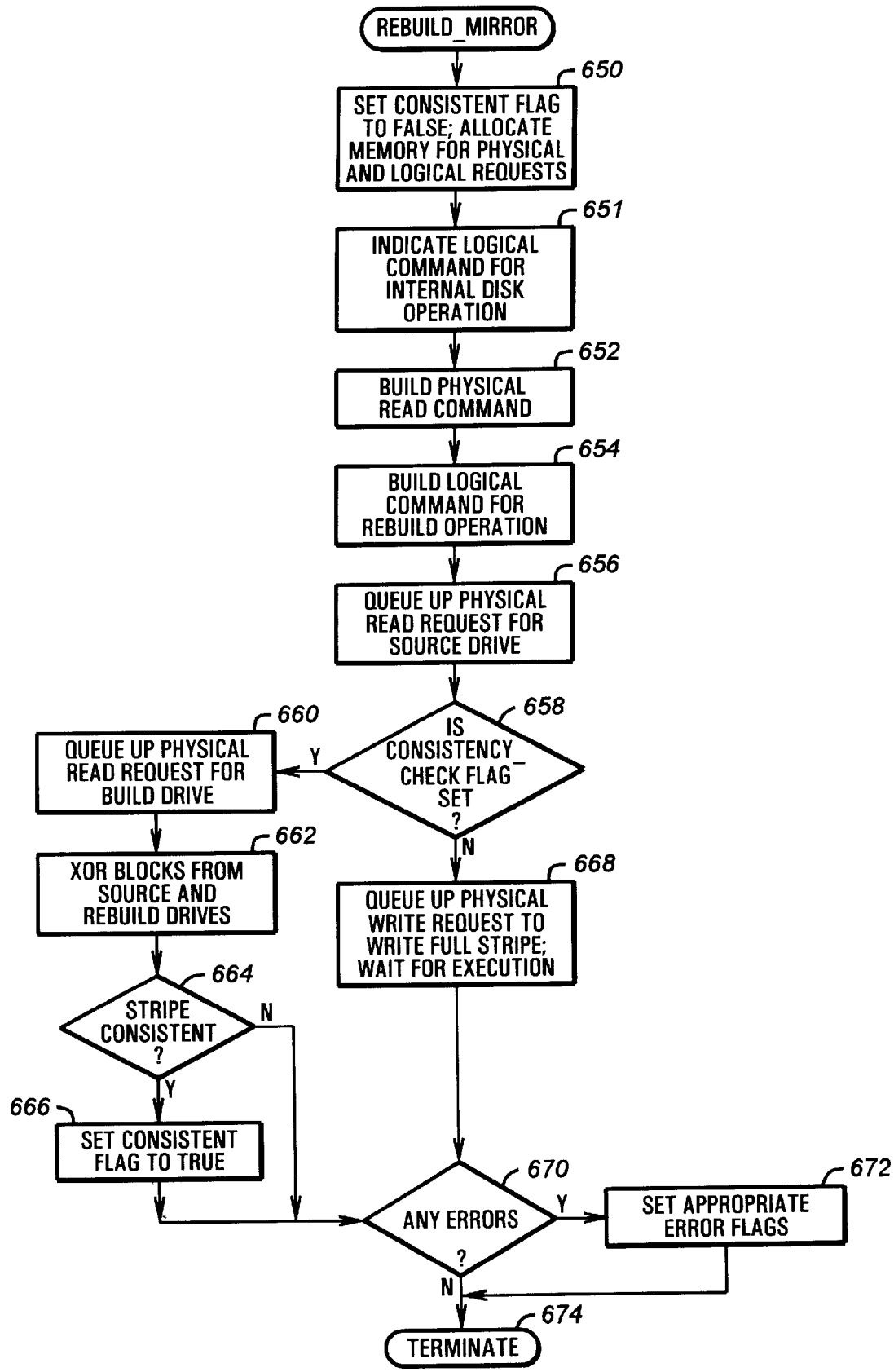
FIG. 8 is a flowchart diagram illustrating a REBUILD_MIRROR module which rebuilds a mirror fault tolerant stripe.

Shown in FIG. 8 is REBUILD_MIRROR which rebuilds a single stripe of a logical volume employing a mirror fault tolerant data protection scheme. Control begins at step 650 wherein local processor 206 allocates memory space for the physical and the logical requests and sets CONSISTENT to FALSE. As previously discussed, the logical requests are preferably located in local memory 208. The physical requests can either be located in local memory 208, transfer memory 202 or any other memory accessible by the requested disk controller 114. Control transfers from step 650 to step 651 wherein local processor 206 begins building a logical request with a request identifier which indicates the logical request was internally generated. Control then transfers to step 652 wherein local processor 206 builds a physical read request for disk controller 114. Control then transfers to step 654 wherein local processor 206 completes building the logical REBUILD request. Control transfers from step 654 to step 656 wherein local processor 206 queues up a physical read request to read a stripe from the source drive. Control then transfers to step 658 wherein local processor 206 checks whether CONSISTENCY_CHECK has been set equal to TRUE. If so, then control transfers to step 660 wherein local processor 206 queues up a physical read request to read a stripe from the physical replacement drive in order to check for consistency of the mirror stripe. Control then transfers from step 660 to step 662 wherein local processor 206 uses ASIC 204 to XOR the logical blocks read from the rebuild and source drives. Control transfers from step 662 to step 664 wherein local processor 206 uses ASIC 204 to check for a null logical block which would indicate a consistent stripe. If the checked stripe is consistent, then control transfers to step 666 wherein CONSISTENT is set to TRUE. Control transfers from step 666 to step 670. If in step 664 local processor 206 determines that CONSISTENT is FALSE, then control transfers from step 664 to step 670.

In step 658 if CONSISTENT_CHECK is FALSE, then control transfers from step 658 to step 668 wherein local processor 206 queues up a physical write request to write the rebuilt stripe to the logical volume. The local processor 206 then waits for the physical write request to be executed. Control transfers from step 668 to step 670 wherein local processor 206 checks if there were any errors in the rebuilding process. If so, then control transfers from step 670 to step 672 wherein ERROR is set appropriately, and control then transfers to step 674. If there were no errors, control transfers to step 674 wherein REBUILD_MIRROR is terminated.

To summarize the functions of the REBUILD_MIRROR module, if it is not time to check for a consistent stripe, as indicated by CONSISTENCY_CHECK being FALSE, REBUILD_MIRROR rebuilds a mirror fault tolerant single stripe of the logical volume by copying the appropriate logical block from the source drive to the rebuild drive. If CONSISTENCY_CHECK is TRUE, REBUILD_MIRROR XORs the appropriate logical blocks of the source and rebuild drives in order to check for a consistent stripe.

Figure 9:
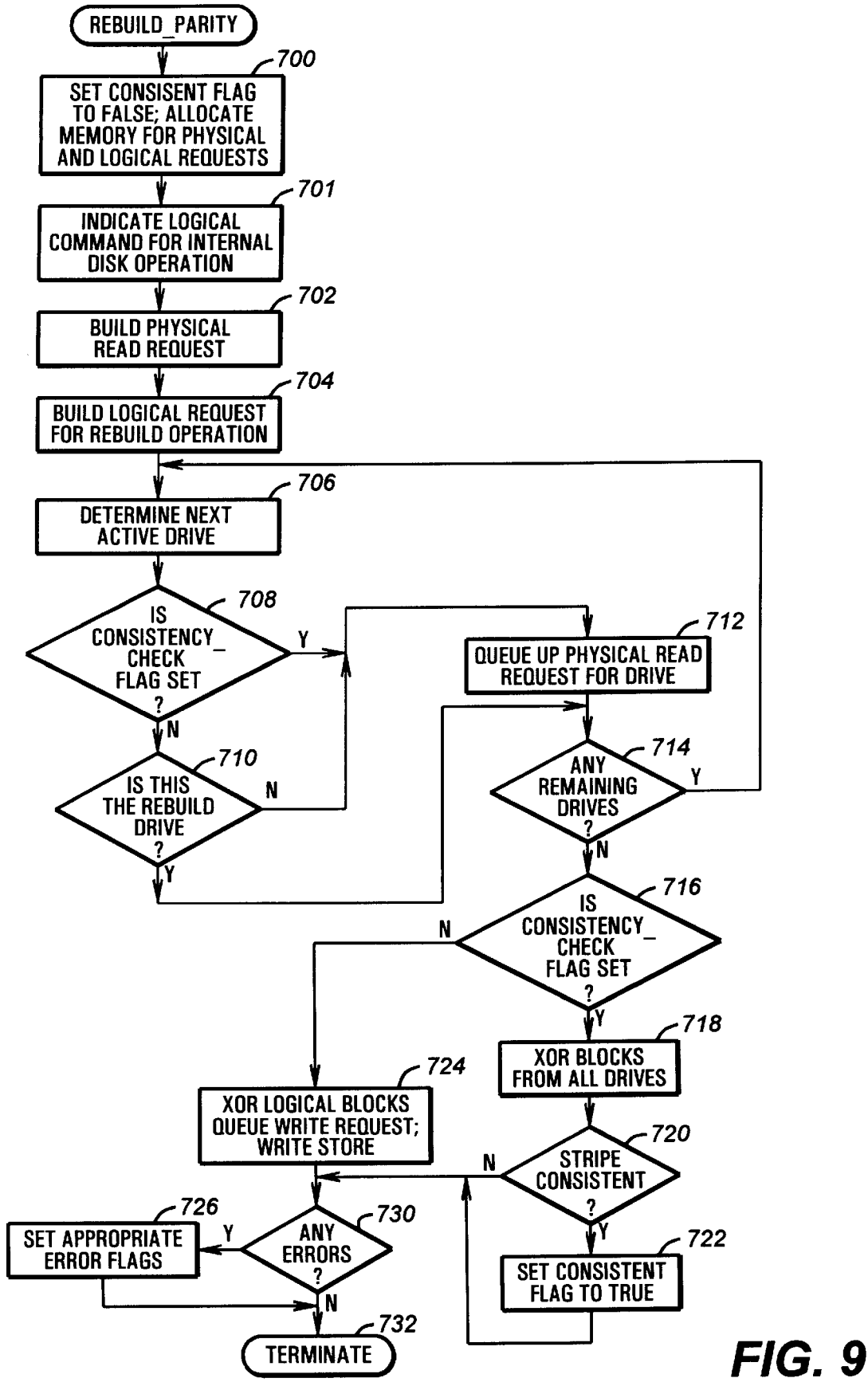
FIG. 9 is a flowchart diagram illustrating a REBUILD_PARITY module which rebuilds a parity fault tolerant stripe.

Shown in FIG. 9 is REBUILD_PARITY which rebuilds a single stripe of a logical volume employing a parity fault tolerant data protection scheme. Control begins at step 700 wherein local processor 206 allocates memory space for physical and logical requests and sets CONSISTENT to FALSE. Control then transfers to step 701 wherein local processor 206 begins building a logical REBUILD request by writing the request identifier to indicate the logical request is being generated internally and not from logical command list 300. Control then transfers to step 702 wherein local processor 206 builds a physical read request. Control then transfers to step 704 wherein local processor 206 completes building the logical REBUILD request. Control then transfers to step 706 wherein local processor 206 selects one active drive of the logical volume. Control then transfers to step 708 wherein it is determined whether CONSISTENCY_CHECK has been set equal to TRUE. If not, then control transfers from step 708 to step 710 wherein local processor 206 determines if the active drive selected in step 706 is the rebuild drive. If so, then control transfers from step 710 to step 714. If not, then control transfers from step 710 to step 712. If in step 708 local processor 206 determines CONSISTENCY_CHECK has been set equal to TRUE, then control transfers from step 708 to step 712. In step 712 local processor 206 queues up a physical read request to read a stripe from the active drive. Control transfers from step 712 to step 714. In step 714 local processor 206 determines if there are any remaining active drives 112 used by the logical volume. If so, control transfers from step 714 to step 706 which determines the next active drive. If there are no more active drives, control transfers from step 714 to step 716.

Thus, the blocks of the stripe are loaded into transfer buffer 202 by the method described above. If CONSISTENT_CHECK has been set equal to TRUE, then the logical block from the rebuild drive is also written into transfer memory 202 in order that an XOR function can be performed in order to check for a consistent stripe; however, if CONSISTENCY_CHECK is FALSE, then the logical block from the rebuild drive is not read. Still referring to FIG. 8, in step 716, local processor 206 determines if CONSISTENCY_CHECK has been set. If so, then control transfers to step 718 wherein the logical blocks from all of the read drives 112 are XORed together using ASIC 204. This also includes the logical block read from the rebuild drive. Control then transfers from step 718 to step 720 wherein local processor 206 determines if the checked stripe is consistent. This would occur when the XOR of all of the logical blocks produces a null logical block. If the stripe is inconsistent, then control transfers to step 730. If the stripe is consistent, then control transfers to step 722 wherein CONSISTENT is set equal to TRUE. Control then transfers from step 722 to step 730.

In step 716 if CONSISTENCY_CHECK is FALSE, then control transfers to step 724 wherein the logical blocks read into memory 202 are XORed together, thereby creating a rebuilt logical block for the rebuild drive. Also in step 724, processor 206 builds a physical write request in order to write the rebuilt stripe back to the logical volume. The local processor 206 then waits for the execution of the physical write request. Control then transfers from step 724 to step 730 wherein local processor 206 checks for any errors which occurred in the rebuilding of the stripe. If there were errors, then control transfers from step 730 to step 726 wherein ERROR is set accordingly. Control then transfers from step 726 to step 732. If in step 730 local processor 206 determines there were no errors in the rebuilding of the stripe, control transfers from step 730 to step 732 wherein REBUILD_PARITY is terminated.

To summarize the functions of the REBUILD_PARITY module, if it is not time to check for a consistent stripe, as indicated by CONSISTENCY_CHECK being FALSE, REBUILD_PARITY rebuilds a parity fault tolerant stripe of the logical volume by XORing the appropriate logical blocks from each drive 112 in order to obtain the rebuilt logical blocks that are written to the rebuild drive. If CONSISTENCY_CHECK is TRUE, REBUILD_PARITY XORs the logical blocks from each drive 112 in order to check for consistency.

Disk rebuilding operations generate their own physical requests for drives 112 just as the foreground task generates physical requests for drives 112 from command list 300. The rebuilding operations discussed above are called by a background task; therefore, the foreground task competes with the background task for the submission of physical requests. In order to allow rebuild operations to proceed, a fixed delay might be placed in the foreground task to allow physical requests generated by the rebuild operations to have priority; however, this arrangement presents problems of its own. While rebuild operations are occurring, the processing time for logical requests handled by the foreground task is significantly increased, thereby increasing the processing time of command list 300. Thus, because disk rebuilding operations may slow down processing of logical requests submitted by logical command list 300, the present invention allows for an user to select rebuild priority through a SET_CONTROLLER command passed through logical command list 300. The SET_CONTROLLER command may be used to set such controller 108 parameters as logical command list 300 verification, a maximum number of physical requests submitted to a physical drive 112, and the rebuild priority which is set by a REBUILD_PRIORITY parameter. The parameters for the SET_CONTROLLER command are located in host memory 100 as addressed by the corresponding scatter/descriptor block 308 in logical command list 300. REBUILD_PRIORITY is one byte long.

FIG. 10 illustrates the structure of REBUILD_PRIORITY. This parameter is selectable from "0" to "255," wherein "0" places rebuild operations at the lowest priority and rebuild operations have a minimum impact on the foreground task. A REBUILD_PRIORITY value of "255" places rebuild operations at the highest priority, thereby significantly reducing the processing of host logical requests by the foreground task. REBUILD_PRIORITY has two ranges, as further explained below. REBUILD_PRIORITY can further be subdivided into a PAUSE_DURATION parameter and a PAUSE_INTERVAL parameter. PAUSE_INTERVAL selects how many logical command lists 300 will be processed before the foreground task is delayed as governed by the value of PAUSE_DURATION. As shown in FIG. 10, when REBUILD_PRIORITY is "0," no delay is added to the processing of logical command lists 300 which allows the foreground task to have the highest priority. When REBUILD_PRIORITY is "255," the foreground task is delayed after every processed command list 300 for a duration of 1.6 seconds, thereby allowing the rebuild operations of the present invention to have the highest priority.

From the range of "1" to "127," REBUILD_PRIORITY selects how often the processing of logical command lists 300 will be delayed. Thus, for this range, REBUILD_PRIORITY linearly affects PAUSE_INTERVAL. When REBUILD_PRIORITY is "1," the processing of one out of one hundred twenty-seven logical command lists 300 is delayed for a duration of 0.1 seconds, and the next one hundred twenty-six logical command lists 300 are processed without being delayed. The frequency of delayed logical command lists 300 increases linearly with REBUILD_PRIORITY until REBUILD_PRIORITY equals "127." For example, when REBUILD_PRIORITY equals "126," the processing of one logical command list 300 out of every two logical command lists 300 is delayed for 0.1 seconds.

From the range of "128" to "255," the processing of every logical command list 300 is delayed with the value of REBUILD_PRIORITY linearly affecting PAUSE_DURATION. For REBUILD_PRIORITY equal to "128," the processing of every logical command list 300 is delayed for 0.1 seconds, the same as for REBUILD_PRIORITY equal to "127;" however, the processing delay for each logical command list 300 increases linearly with REBUILD_PRIORITY. For example when REBUILD_PRIORITY is equal to "136," the processing delay set by PAUSE_DURATION is 0.2 seconds. This processing delay as indicated by PAUSE_DURATION increases linearly until REBUILD_PRIORITY is "255" and the processing of every logical command list 300 is delayed by 1.6 seconds.

Figure 11:
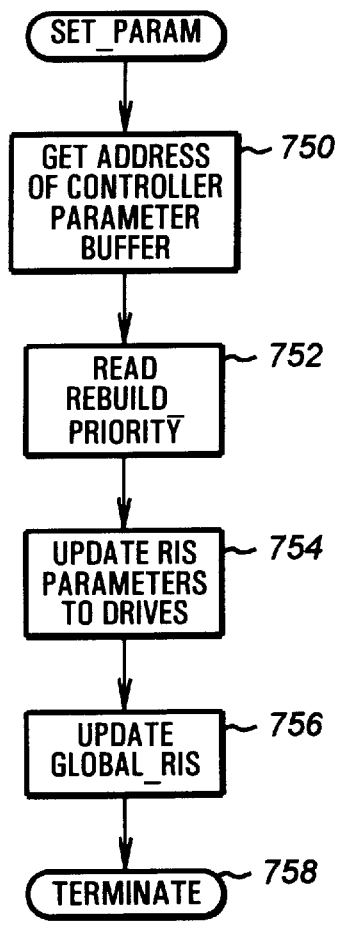

Shown in FIG. 11 is a SET_PARAM module which is called by local processor 206 when the SET_CONTROLLER command is submitted through logical command list 300. Beginning with step 750, local processor 206 gets the address of the controller parameters which exist in memory defined by the appropriate scatter/descriptor block 308. Control then transfers to step 752 wherein local processor 206 reads REBUILD_PRIORITY, one byte in length, which allows the user to select the priority of the rebuild operations. Control then transfers to step 754 wherein local processor 206 updates the RIS parameters to drives 112 which includes the newly obtained REBUILD_PRIORITY. Control then transfers to step 756 wherein local processor 206 updates the GLOBAL_RIS in local memory 208. Control then transfers to step 758, wherein SET_PARAM is terminated.

Figure 12:
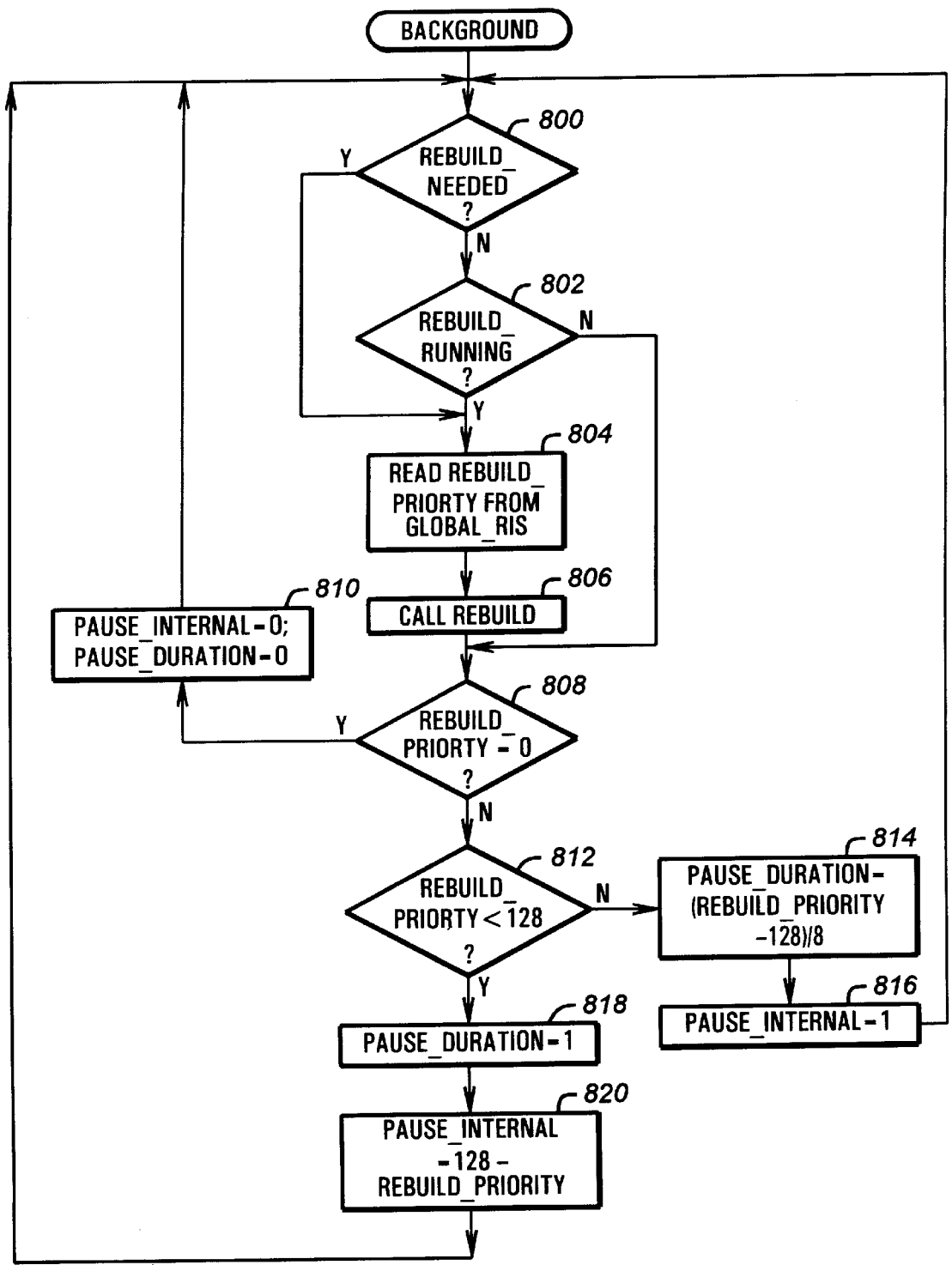
FIG. 12 is a flowchart diagram illustrating a BACKGROUND module which calls the REBUILD module and parses the REBUILD_PRIORITY parameter into a PAUSE_INTERVAL parameter and a PAUSE_DURATION parameter.

Shown in FIG. 12 is a BACKGROUND module, part of the background task, which calls REBUILD and parses REBUILD_PRIORITY into PAUSE_INTERVAL and PAUSE_DURATION as discussed further below. The present invention is not limited to selecting the priority of rebuild operations. Alternatively, the present invention could select the priority of any other background disk operation, such as an expand operation as disclosed in U.S. patent application Ser. No. 08/542897, entitled "On-Line Disk Array Reconfiguration," filed concurrently herewith, which is hereby incorporated by reference. Beginning at step 800, local processor 206 checks REBUILD_NEEDED to determine if it is TRUE. If so, then control transfers to step 804. If REBUILD_NEEDED is FALSE, then control transfers to step 802, wherein local processor 206 determines whether REBUILD_RUNNING is TRUE. If REBUILD_RUNNING is FALSE, then control transfers to step 808. If REBUILD_RUNNING is TRUE, then control transfers to step 804. In step 804, local processor 206 reads REBUILD_PRIORITY from GLOBAL_RIS. Control then transfers to step 806 wherein local processor 206 calls REBUILD. Control then transfers from step 806 to step 808 wherein local processor 206 determines whether REBUILD_PRIORITY is zero, and if so, then control passes to step 810 wherein local processor 206 sets both PAUSE_INTERVAL and PAUSE_DURATION equal to "0." Control passes from step 810 back to step 800. The value for PAUSE_INTERVAL indicates how many logical command lists 300 are processed before a delay is introduced. For example, if PAUSE_INTERVAL equals "1," the processing of every logical command list 300 will be delayed; and if PAUSE_INTERVAL equals "127," one hundred twenty-seven logical command lists 300 will be processed before a delay is introduced. The value for PAUSE_DURATION indicates the length of the delay in one-tenth second increments. For example, if PAUSE_DURATION equals "1," a delay of 0.1 seconds is introduced, and if PAUSE_DURATION equals "16," a delay of 1.6 seconds is introduced. If in step 808 REBUILD_PRIORITY is not equal to zero, control passes to step 812 wherein local processor 206 determines if REBUILD_PRIORITY is less than 1"128, " and if so, control passes to step 818 wherein local processor 206 sets PAUSE_DURATION equal to "1." Control passes from step 818 to step 820 wherein local processor 206 sets PAUSE_INTERVAL equal to the difference between "128" and REBUILD_PRIORITY. If in step 812 REBUILD_PRIORITY is greater than or equal to "128," control passes to step 814 wherein local processor 206 sets PAUSE_DURATION equal to the integral difference between REBUILD_PRIORITY and "128" divided by "8." Control passes from step 814 to step 816 wherein local processor 206 sets PAUSE_INTERVAL equal to "1." Control passes from both steps 816 and 820 back to step 800.

Figure 13:
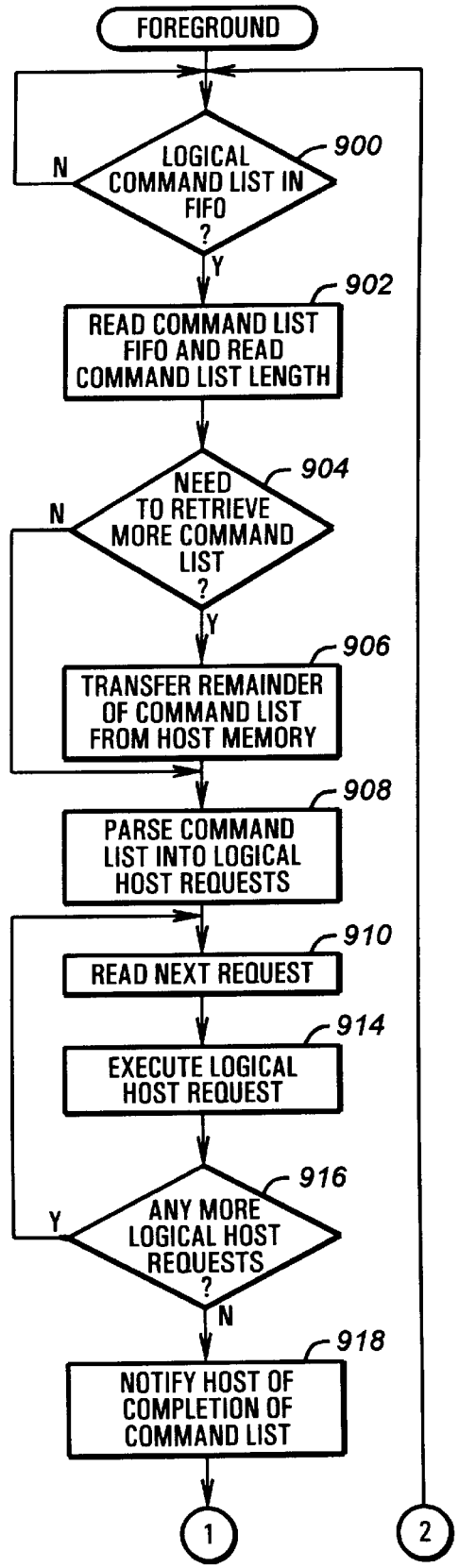
FIGS. 13 and 14 are a flowchart diagram illustrating a FOREGROUND module which retrieves and executes host logical requests.
Figure 14:
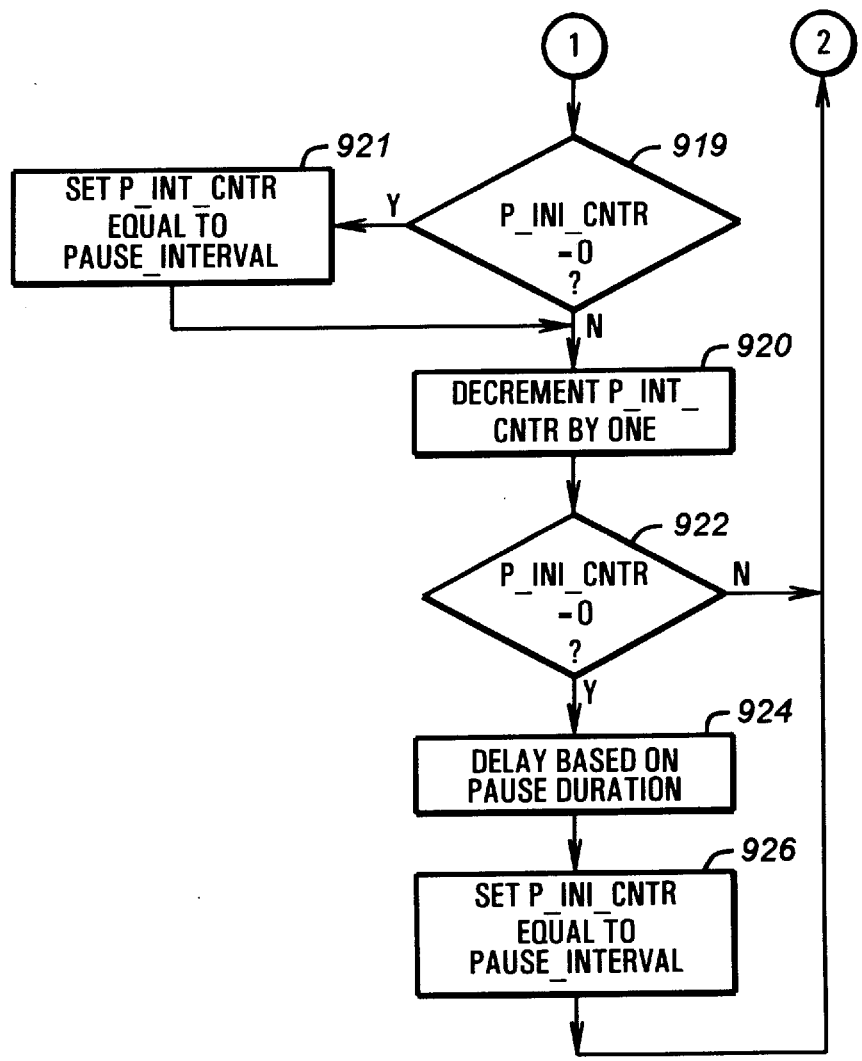

Shown in FIGS. 13 and 14 are a FOREGROUND module, the foreground task, which processes logical command list 300. Beginning with step 900, local processor 206 determines by reading a logical command list status register whether any new logical command lists 300 are in the logical command list FIFO. If not, then control transfers back to step 900 wherein local processor 206 checks again for new logical command lists 300. If a new logical command list 300 exists in the logical command list FIFO, control transfers from step 900 to step 902 wherein local processor 206 retrieves a portion of logical command list 300 into local memory 208. In step 904, local processor 206 determines from the control flags of logical command list 300 if more of logical command list 300 exists in host memory 100. If not, then control transfers from step 904 to step 908. If more of logical command list 300 exists in host memory 100, then local processor 206 transfers the remainder of host list 300 from host memory 100 as previously described. Control then transfers from step 906 to step 908 wherein local processor 206 parses logical command list 300 into logical host requests. Control then transfers to step 910 wherein local processor 206 reads one logical host request generated from step 908. Control then transfers from step 910 to step 914 wherein local processor 206 executes the logical host request, thereby forming one or more physical requests. Control then transfers from step 914 to step 916 wherein local processor determines if there are any more logical host requests. If so, then control transfers from step 916 back to step 910. If there are no more logical host requests, then control transfers from step 916 to step 918 wherein local processor 206 writes the command completion FIFO register with the address of the completed logical command list 300, thereby notifying host processor 104. Control transfers from step 918 to step 919 wherein local processor 206 determines whether a pause interval counter, P_INT_CNTR, is equal to zero, and if so, control passes to step 921 wherein P_INT_CNTR is set equal to PAUSE_INTERVAL. P_INT_CNTR is used to determine the number of processed logical command lists 300 before a delay is to be introduced. Control passes from step 921 to step 920. If in step 919 local processor 206 determines P_INT_ is not equal to zero, control passes from step 919 to step 920. In step 920 local processor 206 decrements P_INT_CNTR by one. Control transfers from step 920 to step 922 wherein local processor 206 determines from its evaluation of P_INT_CNTR whether it is time to delay the foreground task. If not, control transfers back to step 900 wherein local processor 206 begins processing another logical command list 300. If it is time to delay the foreground task, then control transfers from step 922 to step 924 wherein local processor 206 generates a delay based on PAUSE_DURATION. This delay allows more physical requests submitted by the background task to be processed. Control then transfers from step 924 to step 926 wherein P_INT_CNTR is reinitialized to PAUSE_INTERVAL. Control then transfers from step 926 to step 900.

To summarize the selection of background priority, REBUILD_PRIORITY defines two ranges for user selectable delays introduced in the background task's processing of logical command lists 300. The "1" to "127" range linearly sets the frequency of command lists 300 that are delayed for a predetermined time. The "128" to "255" range linearly sets the delay which is introduced during the processing of every logical command list 300 by the background task.

In summary, the present invention relates to a new and improved rebuild algorithm and apparatus for rebuilding a physical replacement drive in a fault tolerant drive array. The REBUILD module determines whether a checked logical volume is using a physical replacement drive; calls the REBUILD_IT module to rebuild or check the consistency of a stripe of data should the logical volume be using the physical replacement drive; and updates the logical volume's rebuild status accordingly. The REBUILD_IT module rebuilds a predetermined number of stripes by calling the REBUILD_MIRROR and REBUILD_PARITY modules; however, after the predetermined number of stripes have been rebuilt, REBUILD_PARITY and REBUILD_MIRROR check for consistency of the next stripe. If the stripe is consistent, another stripe is checked for consistency. When an inconsistent stripe is found, the predetermined number of stripes are rebuilt before consistency is once again checked.

The present invention also allows a user to select priority between background tasks and foreground through a REBUILD_PRIORITY parameter. REBUILD_PRIORITY has two ranges. A value for REBUILD_PRIORITY from "1" to "127" linearly sets the frequency of delays introduced by the background task, wherein "1" delays the processing of one logical command list 300 by the background task out of every one hundred twenty-seven, and "127" delays the processing of every logical command list 300 by the background task. In the described embodiment, the delay is equal to 0.1 seconds. A value from "128" to "255" defines the other range for REBUILD_PRIORITY. In this range, the processing of every command list 300 is delayed with the delay being linearly selectable with "128" corresponding to a delay of 0.1 seconds for every logical command list 300 processed and "255" corresponding to a delay of 1.6 seconds for every logical command list 300 processed.

The foregoing disclosure and description of the invention are illustrative and explanatory thereof, and various changes in the size, shape, materials, components, circuit elements, wiring connections and contacts as well as in the details of the illustrated circuitry and construction may be made without departing from the spirit and scope of the invention.

We claim:

1. For use with a computer system having a mass storage drive array subsystem having a plurality of commands executing as foreground operations and a plurality of commands executing as background operations, a method for selecting priority between execution of the foreground executing commands and the background executing commands, said method comprising the steps of:

providing a priority command indicating a priority level;

converting said priority level into a pause duration indicative of the time to pause a foreground executing command and a pause interval indicating the number of foreground executing commands out of a predetermined number of foreground executing commands to pause for said pause duration;

determining if the foreground command to be executed is to be paused based on said pause interval;

delaying the foreground command to be executed for the pause duration if the foreground command is to be paused; and executing the background commands without delays.

2. The method of claim 1, wherein said step of providing a priority command is performed by a host processor.

3. The method of claim 1, wherein said steps of determining, delaying and executing are performed by said drive array subsystem.

4. The method of claim 1, wherein said background command includes a rebuild command.

5. The method of claim 1, wherein said foreground command includes a user logical request command.

6. The method of claim 1, wherein said priority level can be set from a zero to a highest level and wherein said pause duration and pause interval are zero when said priority level is zero, said pause duration is a first value and said pause interval varies from one command in said predetermined number of commands to every command as said priority level varies from above zero to an intermediate value between zero and said highest level and said pause duration varies from said first value to a second, larger value and said pause interval is every command as the priority level varies from said intermediate value to said highest level.

7. A disk array controller for use with a computer system having a mass storage disk drive array, the computer system providing a priority command indicating a priority level between execution of a plurality of commands executing as foreground operations and a plurality of commands executing as background operations, the disk array controller comprising:

means for receiving said priority command;

means coupled to said means for receiving said priority command for converting said priority level into a pause duration indicative of the time to pause a foreground executing command and a pause interval indicating the number of foreground executing commands out of a predetermined number of foreground executing commands to pause for said pause duration;

means coupled to said means for converting said priority level for determining if the foreground command to be executed is to be paused based on said pause interval;

means coupled to said means for determining for delaying the foreground command to be executed for the pause duration if the foreground command is to be paused; and means for executing the background commands without delays.

8. The disk array controller of claim 1, wherein said background command includes a rebuild command.

9. The disk array controller of claim 1, wherein said foreground command includes a user logical request command.

10. The disk array controller of claim 1, wherein said priority level can be set from a zero to a highest level and wherein said pause duration and pause interval are zero when said priority level is zero, said pause duration is a first value and said pause interval varies from one command in said predetermined number of commands to every command as said priority level varies from above zero to an intermediate value between zero and said highest level and said pause duration varies from said first value to a second, larger value and said pause interval is every command as the priority level varies from said intermediate value to said highest level.

11. A computer system comprising:

a mass storage disk drive array subsystem;

means for providing a priority command indicating a priority level between a plurality of commands executing as foreground operations and a plurality of commands executing as background operations;

means for receiving said priority command;

means coupled to said means for receiving said priority command for converting said priority level into a pause duration indicative of the time to pause a foreground executing command and a pause interval indicating the number of foreground executing commands out of a predetermined number of foreground executing commands to pause for said pause duration;

means coupled to said means for converting said priority level for determining if the foreground command to be executed is to be paused based on said pause interval;

means coupled to said means for determining for delaying the foreground command to be executed for the pause duration if the foreground command is to be paused; and means for executing the background commands without delays.

12. The computer system of claim 11, wherein said background command includes a rebuild command.

13. The computer system of claim 11, wherein said foreground command includes a user logical request command.

14. The computer system of claim 11, wherein said priority level can be set from a zero to a highest level and wherein said pause duration and pause interval are zero when said priority level is zero, said pause duration is a first value and said pause interval varies from one command in said predetermined number of commands to every command as said priority level varies from above zero to an intermediate value between zero and said highest level and said pause duration varies from said first value to a second, larger value and said pause interval is every command as the priority level varies from said intermediate value to said highest level.

15. For use with a computer system having a mass storage drive array subsystem having a plurality of commands executing as foreground operations and a plurality of commands executing as background operations, a method for selecting priority between execution of the foreground executing commands and the background executing commands by a user of the computer system, the method comprising the steps of:

providing a priority command from the user indicating a priority level to a mass storage drive rate subsystem;

converting the priority level into a pause duration indicative of a time to pause the foreground executing command at a pause interval indicating the number of foreground executing commands out of a predetermined number of foreground executing commands to pause for the pause duration;

determining if the foreground command to be executed is to be pause based on the pause interval;

delaying the foreground command to be executed for the pause duration if the foreground command is to be paused;

executing the background commands without delays.

16. The method of claim 15, wherein the converting step comprises:

parsing the priority command into a pause interval parameter for indicating the number of foreground executing commands out of a predetermined number of foreground executing commands and a pause duration parameter indicating a time to pause a foreground executing command.

17. The method of claim 15, wherein the background executing command is a rebuild command.

18. The method of claim 15, wherein the providing step comprises:

passing a priority command from the user through a logical command list.

19. A disk array controller for use with a computer system having a mass storage disk drive array, the computer system providing a priority command indicating a priority level to an execution of a plurality of commands executing as foreground operations and a plurality of commands executing as background operations, a disk array controller comprising:

a memory controller for receiving the priority commands;

a local memory for storing disk array code; and a local processor for executing the disk array code stored in the local memory to perform the steps of:

converting the priority level into a pause duration indicative of the time the pause the foreground executing command and a pause interval indicating the number of foreground executing commands out of a predetermined number of foreground executing commands to pause for the pause duration;

determining if the foreground command to be executed is to be pause based on the pause interval;

delaying the foreground command to be executed for the pause duration if the foreground command is to be paused; and executing the background commands without delays.

20. The disk array controller of claim 19, wherein the background command includes a rebuild command.

21. The disk array controller of claim 19, wherein the foreground command includes a user logical request command.

22. The disk array controller of claim 19, wherein the priority level can be set from a 0 to the highest level wherein the pause duration and pause interval are zero when the priority level is 0, the pause duration is a first value and the pause interval varies from one command in the predetermined number of commands to every command as the priority level varies from above zero to an intermediate value between zero and the highest level, and the pause duration varies from the first value to a second larger value and the pause interval is every command as the priority level varies from the intermediate value to the highest level.

23. A computer system, comprising:
 a mass storage disk drive array subsystem;
 a logical command list for providing a priority command indicating a priority level between a plurality of commands executing as foreground operations and a plurality of commands executing as background operations;
 a disk array controller, comprising:
  a memory controller for receiving the priority commands;
 a local memory for storing disk array code; and
 a local processor for executing the disk array code stored in the local memory to perform the steps of:
  converting the priority level into a pause duration indicative of the time the pause the foreground executing command and a pause interval indicating the number of foreground executing commands out of a predetermined number of foreground executing commands to pause for the pause duration;
  determining if the foreground command to be executed is to be pause based on the pause interval;
  delaying the foreground command to be executed for the pause duration if the foreground command is to be paused; and
 executing the background commands without delays.

24. The computer system of claim 23, wherein the background command includes a rebuild command.

25. The computer system of claim 23, wherein the foreground command includes a user logical command.

26. The computer system of claim 23, wherein the priority level can be set from a 0 to the highest level wherein the pause duration and pause interval are zero when the priority level is 0, the pause duration is a first value and the pause interval varies from one command in the predetermined number of commands to every command as the priority level varies from above zero to an intermediate value between zero and the highest level, and the pause duration varies from the first value to a second larger value and the pause interval is every command as the priority level varies from the intermediate value to the highest level.

* * * * *

UNITED STATES PATENT AND TRADEMARK OFFICE
CERTIFICATE OF CORRECTION

PATENT NO. : 5,822,584
DATED : October 13, 1998
INVENTOR(S) : Mark J. Thompson et al.

It is certified that error appears in the above-identified patent and that said Letters Patent is hereby corrected as shown below:

Column 4,
Line 24, delete "1" and insert -- 11 --.

Column 20,
Lines 30 and 32, after "foreground" insert -- executing --.
Lines 36 and 42, after "background" insert -- executing --.
Line 45, before "command" insert -- executing --.
Lines 54-55, after "value" delete "and said".
Line 55, delete "pause interval is every command".

Column 21,
Line 1, after "indicating" delete "the" and insert -- a --.
Lines 6, 9, 10, 17, 48, 51 and 52, after "foreground" insert -- executing --.
Lines 12, 15, 54, 57 and 59, after "background" insert -- executing --.
Line 28, after "value" delete "and said pause interval is every command",
Line 33, after "subsystem" delete ";" and insert -- having a plurality of commands executing as foreground operations and a plurality of commands executing as background operations; --.
Line 36, after "and" delete "a" and insert -- the --.
Line 42, after "indicating" delete "the" and insert -- a --.

Column 22,
Line 3, after "value" delete "and said pause interval is every command".
Lines 22, 24, 25, 60 and 62, after "foreground" insert -- executing --.
Lines 28, 65 and 67, after "background" insert -- executing --.
Line 55, after "time" delete "the" and insert -- to --.

Column 23,
Line 2, after "foreground" insert -- executing --.
Line 13, delete "and the pause interval is every command".
Line 24, delete "com-".
Line 25, delete "mands;" and insert -- command; --.
Line 30, after "time" delete "the" and insert -- to --.

UNITED STATES PATENT AND TRADEMARK OFFICE
CERTIFICATE OF CORRECTION

PATENT NO. : 5,822,584
DATED : October 13, 1998
INVENTOR(S) : Mark J. Thompson et al.

It is certified that error appears in the above-identified patent and that said Letters Patent is hereby corrected as shown below:

Column 24,
Lines 5, 8 and 9, after "foreground" insert -- executing --.
Line 11, after "background" insert -- executing --.
Lines 14 and 16, after "ground" insert -- executing --.
Line 25, after "larger value" delete "and the pause".
Line 26, delete "interval is every command".

Signed and Sealed this

Twenty-first Day of February, 2006

JON W. DUDAS
*Director of the United States Patent and Trademark Office*